United States Patent
Linde et al.

(10) Patent No.: US 9,712,266 B2
(45) Date of Patent: Jul. 18, 2017

(54) SYNCHRONIZATION OF MULTI-CHANNEL AUDIO COMMUNICATED OVER BLUETOOTH LOW ENERGY

(71) Applicant: Apple Inc., Cupertino, CA (US)

(72) Inventors: Joakim Linde, Palo Alto, CA (US); Baek S. Chang, San Francisco, CA (US); Renaud Lienhart, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 395 days.

(21) Appl. No.: 14/075,273

(22) Filed: Nov. 8, 2013

(65) Prior Publication Data

US 2014/0348327 A1 Nov. 27, 2014

Related U.S. Application Data

(60) Provisional application No. 61/825,624, filed on May 21, 2013.

(51) Int. Cl.
*H04H 5/00* (2006.01)
*H04H 20/88* (2008.01)
*H04W 4/00* (2009.01)

(52) U.S. Cl.
CPC ............ *H04H 20/88* (2013.01); *H04W 4/008* (2013.01)

(58) Field of Classification Search
CPC ........ H04R 2420/07; H04R 3/12; H04R 3/00; H04R 5/02; H04R 5/04; H04R 2430/01; H04R 25/554; H04R 29/008; H04R 2201/103; H04R 2205/021; H04R 2205/024; H04R 2225/33; H04R 2225/49;
(Continued)

(56) References Cited

U.S. PATENT DOCUMENTS 8,102,836 B2   1/2012   Jerlhagen et al.
8,558,951 B2  10/2013   Hagg
(Continued)

FOREIGN PATENT DOCUMENTS

WO   WO2009/144537 A1   12/2009
WO   WO 2012/167479     * 12/2012   ............. G10L 21/04
WO   WO2012167479 A1   12/2012

OTHER PUBLICATIONS

Written Opinion of the International Preliminary Examining Authority for PCT/US2014/032992 mailed Apr. 27, 2015, Apple Inc., pp. 1-10.
(Continued)

*Primary Examiner* — Lao Lun-See
(74) *Attorney, Agent, or Firm* — Meyertons Hood Kivlin Kowert & Goetzel, P.C.; Jeffrey C. Hood

(57) ABSTRACT

This document describes techniques for synchronizing rendering of multi-channel audio output. First audio data corresponding to a first audio channel and second audio data corresponding to a second audio channel may be received. The first and second audio data may be configured for simultaneous rendering. A transmission schedule for wirelessly transmitting audio data to each of first and second audio rendering devices may be configured, according to which the first audio data may be scheduled for transmission to the first audio rendering device after the second audio data is scheduled for transmission to the second audio rendering device by a first length of time. An indication may be wirelessly transmitted to the second audio rendering device to delay rendering audio data by the first length of time. The first and second audio data may be wirelessly transmitted to the first and second audio rendering devices according to the transmission schedule.

20 Claims, 13 Drawing Sheets

(58) Field of Classification Search
CPC ... H04R 2225/55; H04R 25/30; H04L 65/80; H04L 29/06; H04L 29/06027; H04L 47/36; H04L 65/60; H04L 65/604; H04L 69/04; H04L 69/161; H04L 69/166; H04L 69/22; H04L 45/42; H04L 12/1868; H04L 12/189; H04L 1/0002; H04L 1/10; H04M 2207/18; H04M 3/42204; H04M 3/493; H04M 1/0272; H04M 1/21; H04M 1/64; H04M 1/7253; H04M 1/72597; H04M 2250/02; H04M 3/436
USPC ............ 381/1–3, 17–23, 80; 455/3.06, 3.01; 700/94
See application file for complete search history.

(56) References Cited

U.S. PATENT DOCUMENTS

| | | | |
|---|---|---|---|
| 2004/0223622 A1* | 11/2004 | Lindemann | H04R 5/04 381/79 |
| 2006/0153155 A1* | 7/2006 | Jacobsen | H04L 1/1829 370/338 |
| 2007/0087686 A1 | 4/2007 | Holm et al. | |
| 2009/0298420 A1* | 12/2009 | Haartsen | H04J 3/0658 455/3.06 |
| 2012/0196534 A1 | 8/2012 | Kasslin et al. | |
| 2012/0215519 A1 | 8/2012 | Park et al. | |
| 2013/0024018 A1* | 1/2013 | Chang | G08C 17/02 700/94 |
| 2013/0045684 A1 | 2/2013 | Linde et al. | |
| 2013/0102251 A1 | 4/2013 | Linde et al. | |
| 2013/0251329 A1 | 9/2013 | McCoy et al. | |

OTHER PUBLICATIONS

Office Action from Taiwanese Application No. 103114743, issued May 19, 2015, English and Chinese version, pp. 1-25.
International Search Report and Written Opinion from PCT/US2014/032992, mailed Jul. 3, 2014, Apple Inc., pp. 1-11.

* cited by examiner

SYNCHRONIZATION OF MULTI-CHANNEL AUDIO COMMUNICATED OVER BLUETOOTH LOW ENERGY

PRIORITY CLAIM

The present application claims benefit of priority to U.S. Provisional Application No. 61/825,624 titled "Communicating Audio Data Using Bluetooth Low Energy" and filed on May 21, 2013, whose inventors are Joakim Linde, Baek S Chang, and Renaud Lienhart, which is hereby incorporated by reference in its entirety as though fully and completely set forth herein.

FIELD

The present disclosure relates to wireless devices, and more particularly to techniques for wireless devices to communicate audio data using Bluetooth Low Energy communications.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others. Bluetooth is a family of wireless communication technologies typically used for short-range communication. The Bluetooth family encompasses 'Classic Bluetooth' (also referred to herein as "Classic BT" or simply "BT") as well as 'Bluetooth Low Energy' (referred to herein as "BLE").

SUMMARY

Embodiments are presented herein of various methods for wireless devices to communicate audio data using Bluetooth Low Energy, and of wireless devices configured to implement the various methods.

A "low-energy audio protocol" (LEAP) is described, by which BLE devices may establish parameters of an audio data streaming session. Once a BLE capable master device and a BLE capable slave device have negotiated the various parameters (e.g., codec to be used, device types, stream directionality (e.g., input/output/bidirectional), timing/delay parameters, etc.) of the session, a "low energy audio stream" (LEAS) may be initiated between the master device and the slave device. LEAS data may then be communicated between the master device and the slave device within an overarching BLE framework.

Also described herein are techniques for negotiating a codec to be used to communicate audio data using BLE. A further method presented herein relates to link layer timing techniques and considerations for communicating audio data using BLE. A still further method presented herein relates to techniques for synchronizing audio output communicated from a master device to two slave devices using BLE. Additionally, a method is presented herein relating to providing multiple slave devices with the capability to communicate non-audio data to each other via a master device using BLE audio protocol messages.

The techniques described herein may be implemented in and/or used with a number of different types of devices, including but not limited to hearing aids, remote controls, wireless speakers, set top box devices, television systems, cellular phones, and computers.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

Figure 1:
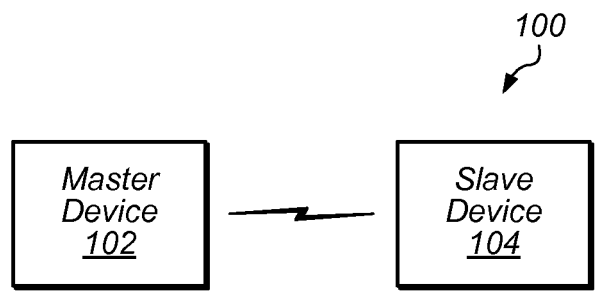
FIGS. 1-3 illustrate exemplary wireless communication systems.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Incorporation by Reference

The Bluetooth Core specification, version 4.0, June 2010, is hereby incorporated by reference in its entirety as though fully and completely set forth herein.

Acronyms

The following acronyms are used in the present disclosure:

UE: User Equipment
BT: Bluetooth
BLE: Bluetooth Low Energy
LE: Bluetooth Low Energy LEA: LE Audio
LEAS: LE Audio Streamer
LEAP: LE Audio Protocol
LL: Link Layer
L2CAP: Logical Link Control and Adaptation Protocol
GATT: Generic Attribute Profile
ATT: Attribute Protocol
CoID: Codec Unique Identifier
ET: Event Type
MIC: Message Integrity Check
MD: More Data
SN: Sequence Number
NESN: Next Expected Sequence Number
RF: Radio Frequency Terms The following is a glossary of terms used in the present disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
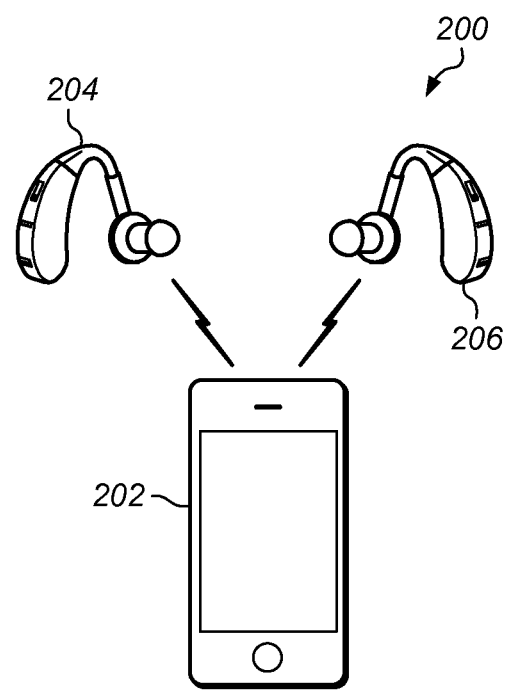
Figure 3:
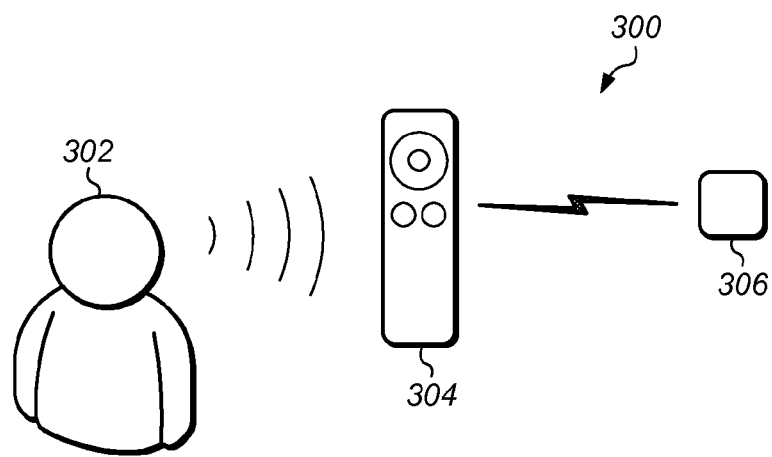

FIGS. 1-3—Communication System

FIG. 1 illustrates an exemplary (and simplified) wireless communication system 100. It is noted that the system of FIG. 1 is merely one example of a possible system, and embodiments may be implemented in any of various systems, as desired.

As shown, the exemplary wireless communication system includes a master (or "central") device 102 which communicates over a transmission medium with a slave (or "peripheral") device 104. The master device 102 and the slave device 104 may communicate via the Bluetooth Low Energy (BLE) wireless communication protocol; the 'master' and 'slave' designations may, in particular, be specific to the roles of the devices 102, 104 with respect to BLE communication. One or both of the master device 102 and the slave device 104 may also be capable of communicating via one or more additional wireless communication protocols, such as any of Bluetooth Classic (also referred to as "BT classic" or simply "BT"), IEEE 802.11 (Wi-Fi), near field communication (NFC), GSM, UMTS (WCDMA), LTE, LTE-Advanced (LTE-A), 3GPP2 CDMA2000 (e.g., 1xRTT, 1xEV-DO, HRPD, eHRPD), Wi-MAX, GPS, etc.

As shown, as one possibility a single master device 102 may communicate with a single slave device 104 at a particular time. In addition, it may also be possible for a master device 102 to communicate using techniques described herein with multiple slave devices 104. For example, using time-slicing techniques, the master device 102 may be able to communicate with slave device 104 at certain periodically scheduled intervals (e.g., during certain frames/subframes), and in between those intervals (e.g., during certain other frames/subframes) the master device 102 may be able to communicate with one or more other slave devices, thereby achieving concurrent communication with multiple slave devices.

The master device 102 may be any of a variety of types of devices. As one possibility, the master device 102 may be a substantially portable wireless user equipment (UE) device, such as a smart phone, hand-held device, a tablet, or virtually any type of wireless device. As another possibility, the master device 102 may be a substantially stationary device, such as a set top box, media player (e.g., an audio or audiovisual device), gaming console, or any of a variety of other types of device.

The slave device 104 may also be any of various types of devices. In some cases, the slave device 104 may be a device with a relatively low power usage profile, e.g., which is designed to operate for relatively long periods of time before replacing or recharging its power source. Some examples might include hearing aids, speakers, remote control devices, microphones, headsets, various types of sensors, watches and other wearable computing devices, etc. Note that some devices may be configured to act as either a master device or a slave device, while others may be configured to act only as a master device, or only as a slave device.

Each of the master device 102 and the slave device 104 may include a processor that is configured to execute program instructions stored in memory. The master device 102 and/or the slave device 104 may perform any of the method embodiments described herein by executing such stored instructions. Alternatively, or in addition, the master device 102 and/or the slave device 104 may include a programmable hardware element such as an FPGA (field-programmable gate array) that is configured to perform any of the method embodiments described herein, or any portion of any of the method embodiments described herein.

Each of the master device 102 and the slave device 104 may include one or more antennas for communicating using one or more wireless communication protocols. In some cases, one or more parts of a receive and/or transmit chain may be shared between multiple wireless communication standards; for example, a device might be configured to communicate using either of Bluetooth or Wi-Fi using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using either of LTE or CDMA2000 1xRTT, and separate radios for communicating using each of Wi-Fi and Bluetooth. Other configurations are also possible.

The slave device 104 may include one or more microphones and/or one or more speakers, e.g., in order to receive and/or render audio. For example, the slave device 104 might include one or more microphones for picking up audio in order to provide audio input to the master device 102, one or more speakers for rendering audio received as audio output from the master device 102, or may include both microphone and speaker for use in conjunction with any of input, output, or bi-directional communication with the master device 102. The master device 102 may similarly include one or more microphones and/or one or more speakers. Note additionally that aspects of the present disclosure may also be implemented in scenarios in which one or both of the master device 102 and the slave device 104 do not include speakers and/or microphones; for example, a media player acting as a master device might be capable of providing audio output (e.g., from stored audio data, such as music files, or from a remote (e.g., cloud based) audio source) to a speaker device or other audio rendering device even if the media player does not itself include a microphone or speaker.

As one example of a possible wireless communication system, FIG. 2 illustrates a system 200 in which a wireless user equipment (UE) device 202 (e.g., a smart phone, acting as a central or master device) is in communication with a pair of hearing aids 204, 206 (acting as peripheral or slave devices). In such an exemplary implementation, the UE 202 may provide audio data (e.g., audio from a phone call, voice or video chat application, media player application, or any other audio) as an output audio stream to the hearing aids 204, 206 via BLE communication as described herein.

As another example of a possible wireless communication system, FIG. 3 illustrates a system 300 in which a remote control device 304 (acting as a peripheral or slave device) is in communication with a set top box 306 (acting as a master or central device). In such an exemplary implementation, the remote control 304 may receive audio signals (e.g., voice commands for controlling the set top box 306) from a user 302 via a microphone, and may provide audio data corresponding to those audio signals as an input audio stream to the set top box 306 via BLE communication as described herein. Once the audio data is received at the set top box 306, the following may be performed: the set top box 306 may communicate the audio data to a server (not depicted in FIG. 3) via the Internet for processing; the server may analyze the received audio data and determine that the audio data corresponds to a command that can be executed by the set top box 306; the server may transmit one or more messages back to the set top box 306 that indicate the command; and then the set top box 306 may execute the command.

Alternatively or additionally, the set top box 306 of FIG. 3 may execute a videoconferencing application. In such a scenario, the remote control 304 may receive audio signals from the user 302 via a microphone, and may provide audio data corresponding to those signals as an input audio stream to the set top box 306 via BLE communication as described herein. Upon receiving the input audio stream, the set top box 306 may transmit the audio data to one or more other endpoints (not depicted in FIG. 3) and/or intermediate servers (not depicted in FIG. 3) involved in the videoconference via the Internet.

As another variation on the wireless communication system of FIG. 3, instead of a set top box 306 as shown in FIG. 3, the wireless communication system may include a BLE-capable television system that, in addition to performing functionality performed by a television system (e.g. rendering video data onto a display, and so on), includes components that perform the functionality described above as performed by the set top box 306.

While the exemplary wireless communication systems illustrated in FIGS. 2-3 represent possible scenarios in which aspects of the present disclosure may be implemented, it should be recognized that the techniques described herein may also or alternatively be implemented in a variety of alternate scenarios, in conjunction with a variety of other device combinations, as will be apparent to those skilled in the art.

Figure 4:
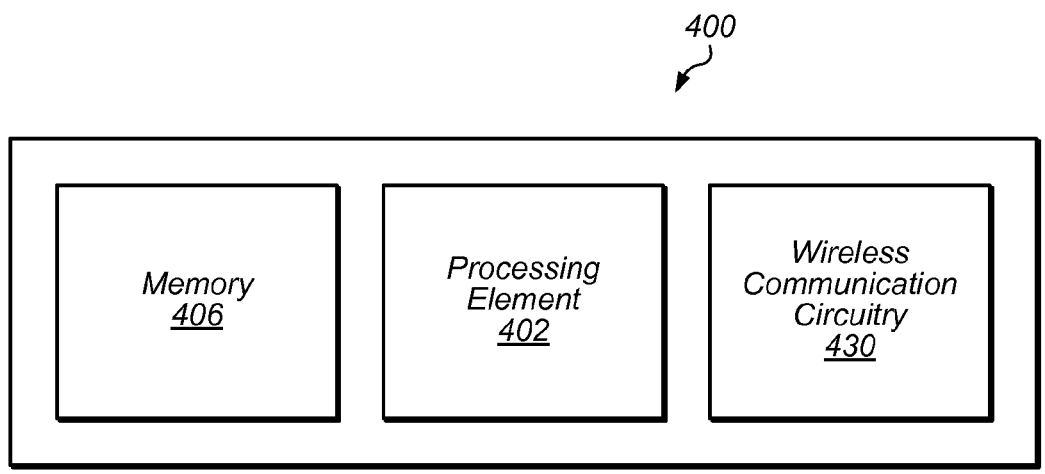
FIGS. 4-5 illustrate exemplary block diagrams of wireless devices.
Figure 5:
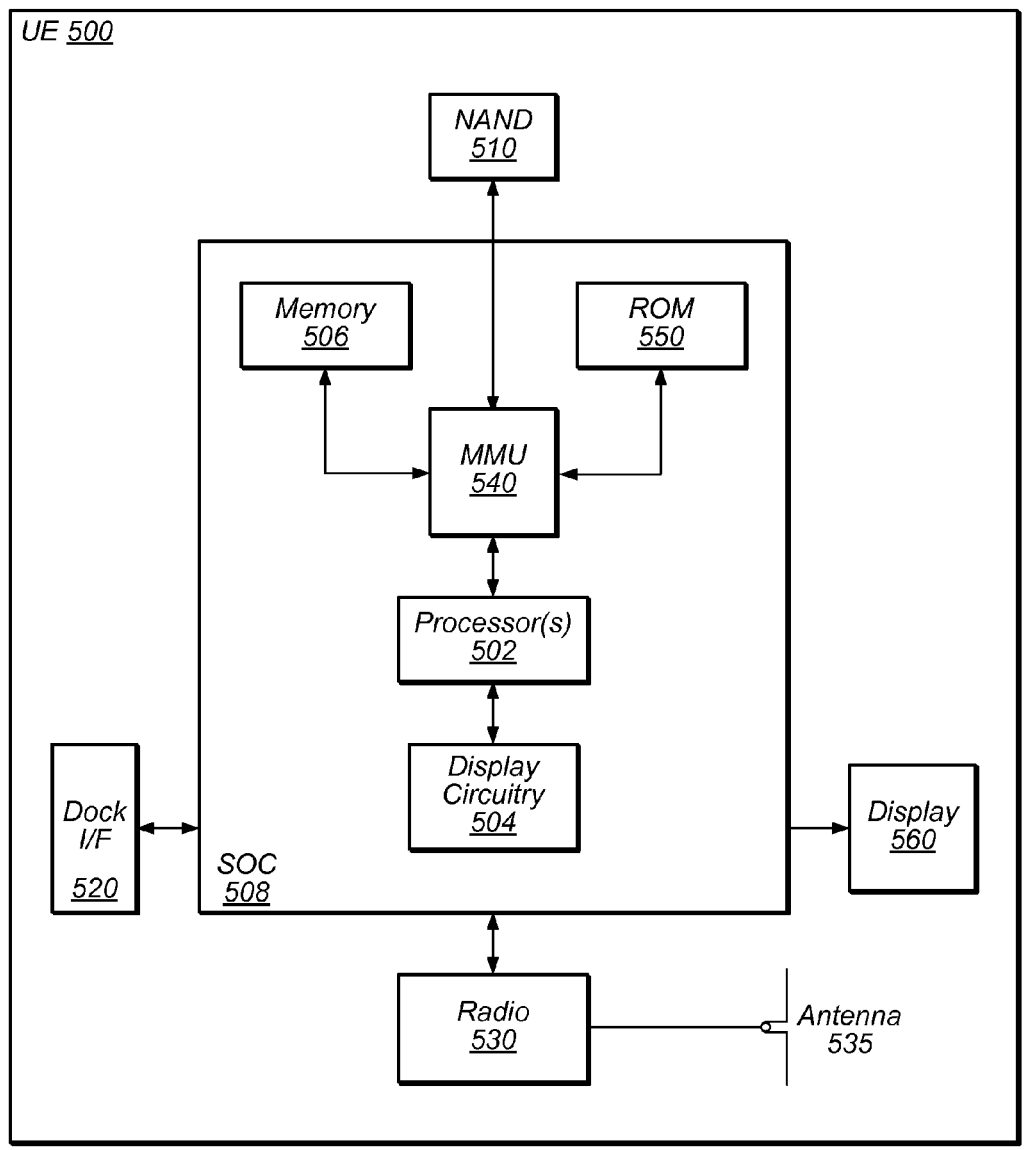

FIGS. 4-5—Exemplary Device Block Diagrams

FIG. 4 illustrates an exemplary wireless device 400 which may be configured for use in conjunction with various aspects of the present disclosure. The device 400 may be any of a variety of types of device and may be configured to perform any of a variety of types of functionality. The device 400 may be a substantially portable device (a mobile device), such as a mobile phone, a personal productivity device, a computer or a tablet, a handheld gaming console, a portable media player, etc. Alternatively, the device 400 may be a substantially stationary device, such as a set top box, television, or other type of substantially stationary device. The device 400 may be configured to operate as a master or central device in a Bluetooth Low Energy wireless communication scheme, and/or may be configured to operate as a slave or peripheral device in a Bluetooth Low Energy wireless communication scheme.

As shown, the device 400 may include a processing element 402. The processing element may include or be coupled to one or more memory elements. For example, the device 400 may include one or more memory media (e.g., memory 406), which may include any of a variety of types of memory and may serve any of a variety of functions. For example, memory 406 could be RAM serving as a system memory for processing element 402. Other types and functions are also possible.

Additionally, the device 400 may include wireless communication circuitry 430. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 430 may include its own processing element (e.g., a baseband processor), e.g., in addition to the processing element 402. For example, the processing element 402 might be an 'application processor' whose primary function may be to support application layer operations in the device 400, while the wireless communication circuitry 430 might be a 'baseband processor' whose primary function may be to support baseband layer operations (e.g., to facilitate wireless communication between the device 400 and other devices) in the device 400. In other words, in some cases the device 400 may include multiple processing elements (e.g., may be a multi-processor device). Other configurations (e.g., instead of or in addition to an application processor / baseband processor configuration) utilizing a multi-processor architecture are also possible.

The device 400 may additionally include any of a variety of other components (not shown) for implementing device functionality, depending on the intended functionality of the device 400, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 400, such as processing element 402, memory 406, and wireless communication circuitry 430, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 402, peripheral interfaces for communication with peripheral components within or external to device 400, etc.) may also be provided as part of device 400.

The device 400 (e.g., wireless communication circuitry 430 in conjunction with processing element 402, memory 406, and/or other components of device 400) may be configured to communicate audio data using Bluetooth Low Energy wireless communication, such as according to those features described further with respect to any or all of FIGS. 6-17.

FIG. 5 is an exemplary block diagram illustrating details of a UE 500, which may be one possible exemplary implementation of the device 400 illustrated in FIG. 4. As shown, the UE 500 may include a system on chip (SOC) 508, which may include portions for various purposes. For example, as shown, the SOC 508 may include processor(s) 502 which may execute program instructions for the UE 500 and display circuitry 504 which may perform graphics processing and provide display signals to the display 560. The processor(s) 502 may also be coupled to memory management unit (MMU) 540, which may be configured to receive addresses from the processor(s) 502 and translate those addresses to locations in memory (e.g., memory 506, read only memory (ROM) 550, NAND flash memory 510) and/or to other circuits or devices, such as the display circuitry 504, wireless communication circuitry 530 (also referred to as a "radio"), connector I/F 520, and/or display 560. The MMU 540 may be configured to perform memory protection and page table translation or set up. In some embodiments, the MMU 540 may be included as a portion of the processor(s) 502.

As shown, the SOC 508 may be coupled to various other circuits of the UE 500. For example, the UE 500 may include various types of memory (e.g., including NAND flash 510), a connector interface 520 (e.g., for coupling to a computer system, dock, charging station, etc.), the display 560, and wireless communication circuitry (or "radio", as noted above) 530 (e.g., for LTE, LTE-A, CDMA2000, Bluetooth, Wi-Fi, GPS, etc.).

The UE 500 may be configured to communicate wirelessly using multiple wireless communication standards. In such instances, the wireless communication circuitry (radio(s)) 530 may include radio components which are shared between multiple wireless communication standards and/or radio components which are configured exclusively for use according to a single wireless communication standard. As shown, the UE device 500 may include at least one antenna (and possibly multiple antennas, e.g., for MIMO and/or for implementing different wireless communication technologies, among various possibilities), for performing wireless communication with base stations, access points, and/or other devices. For example, the UE device 500 may use antenna 535 to perform the wireless communication.

The UE 500 may also include and/or be configured for use with one or more user interface elements. The user interface elements may include any of various elements, such as display 560 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

As described herein, the UE 500 may include hardware and software components for implementing features for communicating audio data using Bluetooth Low Energy, such as those described herein with reference to any or all of FIGS. 6-17. The processor 502 of the UE device 500 may be configured to implement part or all of the features described herein, e.g., by executing program instructions stored on a memory medium (e.g., a non-transitory computer-readable memory medium). Alternatively (or in addition), processor 502 may be configured as a programmable hardware element, such as an FPGA (Field Programmable Gate Array), or as an ASIC (Application Specific Integrated Circuit). Alternatively (or in addition) the processor 502 of the UE device 500, in conjunction with one or more of the other components 504, 506, 508, 510, 520, 530, 535, 540, 550, 560 may be configured to implement part or all of the features described herein, such as the features described herein with reference to any or all of FIGS. 6-17.

Figure 6:
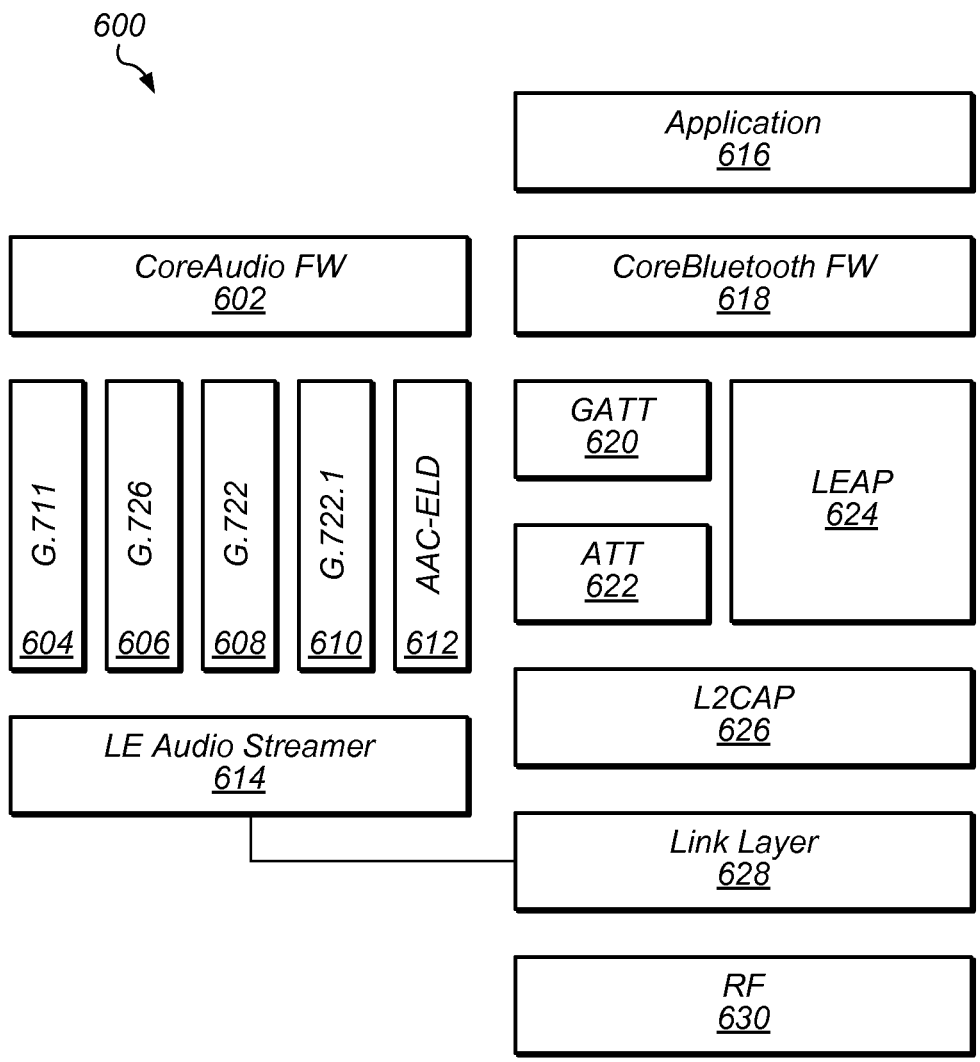
FIG. 6 illustrates an exemplary protocol stack for Bluetooth Low Energy (BLE) audio communication.

FIG. 6—Bluetooth Low Energy Audio Protocol Stack

FIG. 6 illustrates a possible Bluetooth Low Energy protocol stack 600 which may be used to transport audio data via BLE wireless communication. As in existing BLE implementations, an application (app) layer 616 may sit on top of a Core Bluetooth framework 618, which may provide access to GATT 620 and ATT 622 protocols. Below these, an L2CAP layer 626 may interface with a link layer 628, which may in turn interface with an RF layer 630 which may provide the physical interface at which wireless communication may be performed.

In order to provide support for audio communication in the illustrated BLE protocol stack 600, a Core Audio framework 602 may be provided. An audio transport layer (referred to as "Low Energy Audio Streamer", "LE Audio Streamer" or simply "LEAS") 614 may sit directly on top of the link layer 628. The purpose of the LE Audio Streamer 614 may be to transport audio encoded data. The audio data may be encoded for transport using any of a variety of codecs, e.g., depending on the resources available on the device(s) performing the audio transport. For example, audio codecs G.711 604, G.726 606, G.722 608, G.722.1 610, and AAC-ELD 612 are shown in FIG. 6. Other codecs are also possible.

Management of the LEAS path may be handled by the "Low Energy Audio Protocol" (or "LE Audio Protocol", or simply "LEAP") 624. LEAP may be a light weight protocol that sits directly on top of L2CAP 626 in the Bluetooth protocol stack. LEAP 624 may be responsible for setting up and tearing down the LEAS path, codec negotiations, and link layer connection parameter negotiations.

Devices which implement LEAS 614 and LEAP 624 components in their BLE protocol stack such as illustrated in FIG. 6 and described further subsequently herein may thereby be provided with the capability to communicate audio data using BLE wireless communication, such as according to any of various aspects of the present disclosure.

Figure 7:
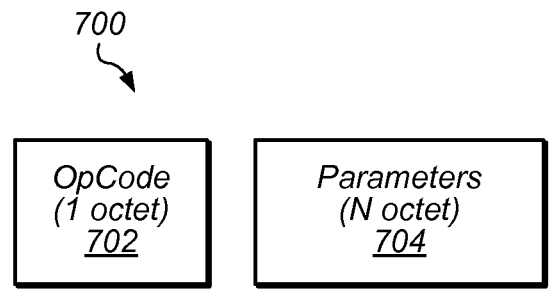
FIG. 7 illustrates an exemplary LE audio protocol packet structure.
Figure 8:
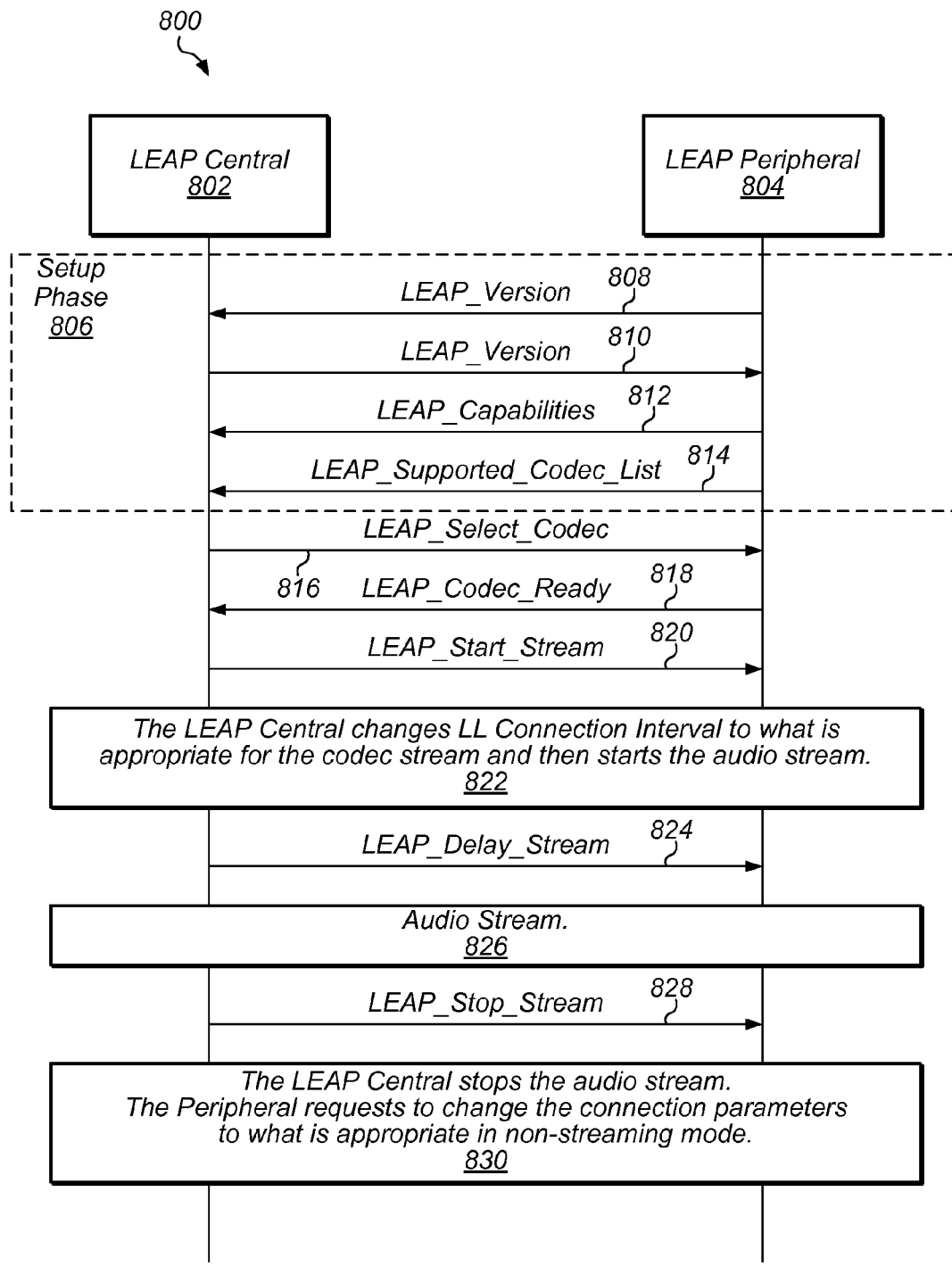
FIGS. 8-9 are message sequence diagrams illustrating exemplary LE audio stream setup and tear down scenarios using an LE audio protocol.
Figure 9:
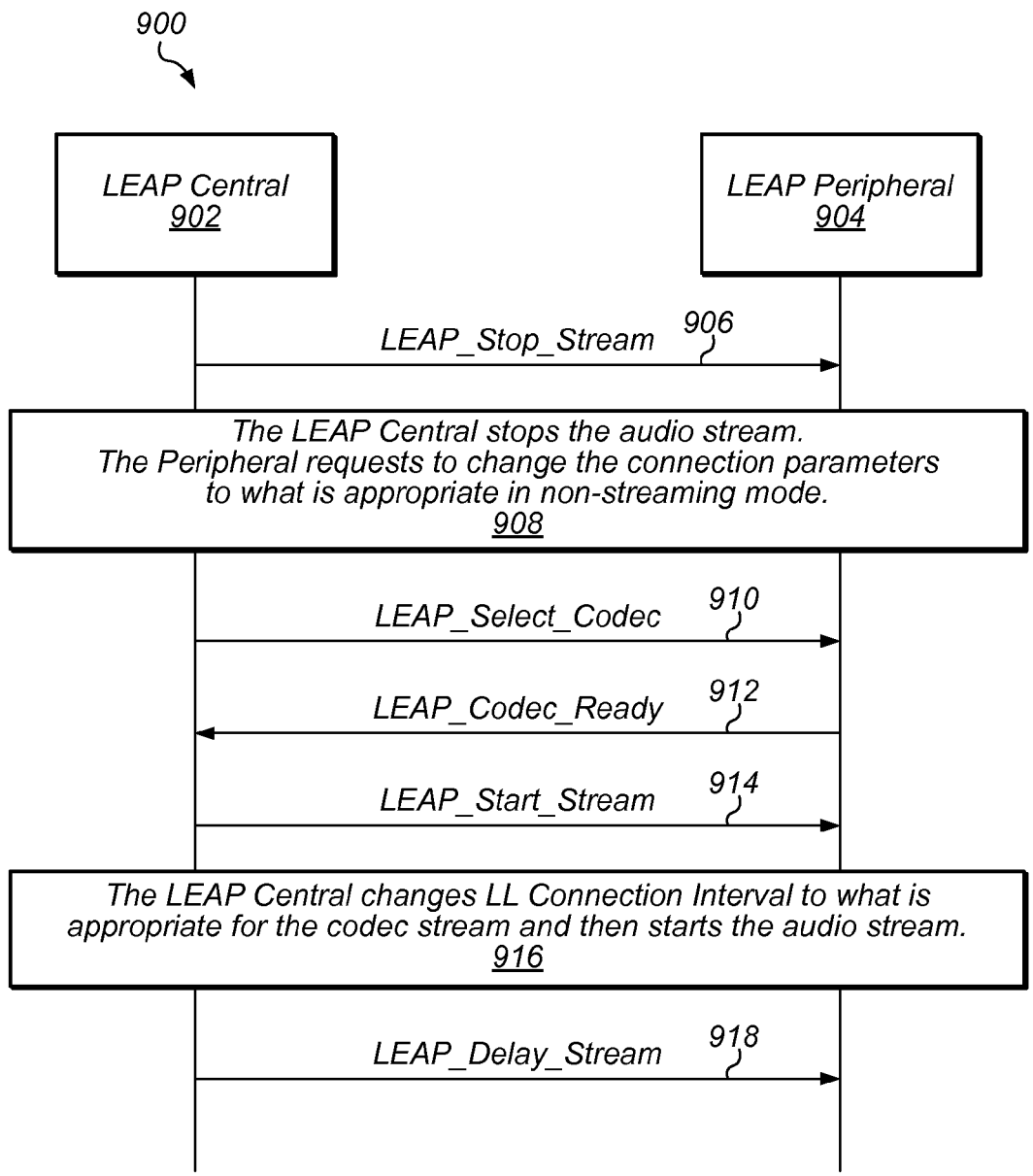

FIGS. 7-9—Exemplary LEAP Packet Structure and Communication Flows

As noted above, LEAP may be responsible for setting up and tearing down a LEAS connection between two devices. It may also be responsible for negotiating what codec to use considering the capabilities of the two devices.

FIG. 7 illustrates one example of a packet (also referred to as protocol data unit or PDU) format 700 which may be used to communicate LEAP data. It should be recognized that any of a variety of alternate packet formats may be used, as desired, and that the format 700 illustrated in FIG. 7 is provided by way of example and is not intended to be limiting to the disclosure as a whole.

As shown, the exemplary packet format 700 may include a 1-octet 'opcode' 702 configured to uniquely identify a packet type of a given LEAP packet. Any number of packet types may be defined, and may be assigned any of various opcodes.

Following the opcode octet 702, the LEAP packet may include one or more parameter fields 704 specific to the type of LEAP packet. Each of the parameter fields 704 may include a predetermined (fixed) number of octets, or may include a variable number of octets. In some cases (e.g., due to communication window limitations) the maximum length of a LEAP packet may be limited. For example, as one possibility, the maximum total length of parameter fields of a LEAP packet might be 22 octets. Other values are also possible.

FIG. 8 is an exemplary message sequence chart 800 illustrating a process to set up and tear down a BLE audio stream between a master or central device 802 and a slave or peripheral device 804 using LEAP. The exemplary message sequence chart illustrated in FIG. 8 includes examples of numerous possible types of LEAP packets, which are described hereinbelow in conjunction with the message sequence chart 800; however, it should be noted that numerous alternative and/or additional types of LEAP packets (e.g., having different formats/parameter fields and/or functions) are also possible. Some further examples of such possible LEAP packet types are also provided further hereinbelow.

The sequence may include an initial setup phase 806. In the setup phase 806, the peripheral device 804 and the central device 802 may exchange LEAP_version messages 808, 810. Each LEAP_version message may include parameters such as a LEAP version parameter, a company identifier parameter, a hardware (HW) version parameter, and a software (SW) version parameter. The LEAP version parameter may indicate the version of the LEAP protocol that the sender implements. The company ID parameter may indicate the Bluetooth Special Interest Group (SIG) company ID of the implementer of the sending device. The HW version parameter may indicate the hardware revision of the sender, while the SW version parameter may indicate the software/firmware revision of the sender.

Following the exchange of LEAP_version messages 808, 810, the peripheral device 804 may declare its capabilities to the central device 802 by sending a LEAP_capabilities packet 812. The LEAP_capabilities message 812 may include parameters indicating the maximum length LEAS packet the peripheral device 804 can receive, which audio directions (e.g., input and/or output) the peripheral device 804 supports, whether or not the peripheral device 804 supports stereo or mono audio, and whether peripheral device 804 corresponds to a left channel or a right channel in case stereo audio is supported.

In addition to the LEAP_version messages 808, 810 and the LEAP capabilities message 812, the initial setup phase 806 may also include transmission of a LEAP_Supported_Codec_List packet 814 from the peripheral device 804 to the central device 802. The LEAP_Supported_Codec_List packet 814 may be a prioritized list of codecs which are supported by the peripheral device 804. For example, a codec unique identifier (or "CoID") may be defined for each of a variety of possible codecs which could be used in conjunction with BLE audio transport, and each parameter field of the LEAP_Supported_Codec_List packet 814 may be a CoID corresponding to a codec which is supported by the peripheral device. The parameter fields may be ordered such that the first parameter field may indicate the CoID of the highest priority (most preferred) supported codec of the sender (e.g., the peripheral device 804), and each subsequent parameter field may indicate the CoID of the next highest priority supported codec of the sender.

In case LEAP packet lengths are limited to a maximum size and the peripheral device 804 supports more codecs than can be specified in a single LEAP_Supported_Codec_List packet given the maximum LEAP packet length, an indication may be provided that more codecs are supported. For example, a special value may be defined as an indication that more codecs are supported, and the last parameter of a LEAP_Supported_Codec_List packet may be set to that special value if appropriate. As a specific example, consider the possibility that a maximum of 22 octets of data may be included in the parameter fields of a LEAP packet, and each parameter (e.g,. each CoID) is specified using one octet of data. In this scenario, the value decimal 255 might be defined as indicating that more codecs are supported than have yet been indicated, and the $22^{nd}$ octet of the parameters section of the packet might be set to the value decimal 255. In such a case, a further packet may be sent from the peripheral 804 to the central 802 indicating further supported codecs. This may be repeated (e.g., further LEAP_Supported_Codec_List packets may be sent from the peripheral 804 to the central 802) until all codecs supported by the peripheral 804 have been communicated.

The setup phase 806 may be completed after transmission of the LEAP_Supported_Codec_List message(s) 814. Based on the resulting prioritized list of supported codecs received from the peripheral device 804 (and on the capabilities/supported codecs and preferences of the central device 802), the central device 802 may then select a codec and transmit a LEAP_Select_Codec message 816 to the peripheral device 804. The LEAP_Select_Codec message 816 may include a parameter indicating the CoID of the selected codec. The LEAP_Select_Codec message 816 may also include one or more other parameters. For example, a parameter indicating the maximum LEAS packet size (e.g., in bytes) to be used in the LE audio stream may be included. As another example, a parameter indicating the connection interval that will be used when sending LEAS packets may be included. The connection interval may be in units of 1.25 ms (e.g., based on BLE frame length), or may possibly be a different length.

Note that the connection interval selected may particularly depend on the codec used for audio transport. For example, if a higher compression, higher efficiency codec is used, it may be possible to communicate audio data corresponding to a longer period of time in a single frame than if a lower compression, lower efficiency codec is used. In this case, it may accordingly be possible to utilize a longer connection interval than if a lower compression, lower efficiency codec is used, since more frequent communication may be necessary with the lower compression, lower efficiency codec. Of course, since higher compression and/or higher efficiency codecs may require greater computational complexity in at least some cases, and in general supporting a greater number of codecs may require more resources, many devices may be limited in the number and compression and efficiency capabilities of codecs supported.

Note additionally that, if desired, a parameter may be included in the LEAP_Select_Codec message 816 to indicate a type of audio content of the LE audio stream being set up. For example, it might be indicated (e.g., using pre-assigned values to indicate various types of audio content) that the content of an audio stream corresponds to voice content (e.g., a phone call), movie or other media audio, etc.

The peripheral device 804 may then transmit a LEAP_Codec_Ready message 818 once it is ready to receive and render audio data. The LEAP_Codec_Ready message 818 may include a parameter indicating a rendering delay on the peripheral side. That is, the peripheral may report what the actual (e.g., inherent to the device) render delay (the time between receiving audio data via the LE audio stream and rendering audio corresponding to the audio data) is, e.g., so that the central device 802 can delay video (e.g., to achieve lip-sync between video and audio) or other corresponding media appropriately. This rendering delay may not include air transmission time (e.g., the central device 802 may account for this separately).

Before sending any audio data, the central device 802 may provide a LEAP_Start_Stream message 820. Typically, the central device 802 may transmit this message to the peripheral device 804 and start the audio stream after the LEAP_Codec_Ready message 818 is received from the peripheral device 804, as shown. However, in some cases the LEAP_Start_Stream message 820 may precede the LEAP_Codec_Ready message 818. In such a case the central device 802 may be aware that the peripheral device 804 may not render the data until the LEAP_Codec_Ready message 818 has been received, but may still send audio data opportunistically to the peripheral device 804, e.g., in case of a real time stream, such as a phone call, which cannot be buffered. The peripheral device 804 may make a best effort attempt to render the audio in such a case.

In some cases, the LEAP_Start_Stream message 820 may not have any parameters. However, in some cases the LEAP_Start_Stream message 820 may include a delay parameter indicating a stream delay (e.g., in microseconds). In such cases the peripheral device 804 may add an extra delay matching the delay value sent by the central device 802 before rendering received audio data. This may be particularly helpful in the case of 'left' and 'right' audio streams going to two different devices, since given the time-sliced (non-simultaneous) nature of BLE communications one device may need to add a delay to the stream in order to achieve a high level of synchronization in rendering audio between the two devices. As a further possibility (e.g., instead of including a delay parameter in the LEAP_Start_Stream message 820), a separate LEAP packet (e.g., the LEAP_Delay_Stream message 824 illustrated in FIG. 8) may be transmitted in case an extra synchronization delay is desired. Further details and explanation of such a feature are also provided hereinbelow with respect to FIGS. 15-16.

Note that at 822, the central device 802 may change the link layer connection interval to what is appropriate for the selected codec (e.g., to the connection interval indicated in the LEAP_Select_Codec message 816) prior to starting the audio stream. At this point the LEAS session may be configured, and at 826, the central device 802 and the peripheral device 804 may engage in the configured LEAS session. Note that LEAS link layer timing and other considerations are discussed further herein with respect to FIGS. 10-14.

Once the LEAS session is complete (or for any of a variety of other reasons for interrupting the LEAS session), the central device 802 may transmit a LEAP_Stop_Stream message 828 to the peripheral device 804. The LEAP_Stop_Stream message 828 may not include any parameters. Once the LEAS session has been stopped, at 830 the peripheral device may request that the connection parameters (e.g., the connection interval) be changed as appropriate for non-streaming mode.

FIG. 9 is an exemplary message sequence chart 900 illustrating a process to change audio codecs in the middle of a LEAS session, or between LEAP sessions, using LEAP. Providing the capability to change codecs, such as in the manner illustrated in FIG. 9, may be desirable in a variety of circumstances. For example, different applications (e.g., a voice streaming/telephony application vs. a media player application) communicating audio data via BLE communication might have different requirements and/or preferences with respect to codecs. Accordingly, if an audio stream from one application on the master device to an audio rendering device is stopped and an audio stream from a different application on the master device to the audio rendering device is initiated, it may be desirable to change the codec used for LE audio communication between the master device and the slave device. It should however also be recognized that it is also possible for different applications to use the same codec. Note also that various other reasons for changing codec (e.g., alternatively or in addition to different application needs/preferences) are also possible.

Note that the message sequence illustrated in FIG. 9 may follow from a message sequence such as illustrated in FIG. 8 (e.g., the LEAP_Stop_Stream message 906 shown in FIG. 9 may correspond to the LEAP_Stop_Stream message 828 shown in FIG. 8), e.g., if the reason for interrupting the LEAS session is to select a new codec. Alternatively, the message sequence illustrated in FIG. 9 may arise in any of a variety of other scenarios, based on any of a variety of message sequences.

As shown, the message sequence may begin with a LEAP_Stop_Stream message 906 transmitted from a central device 902 to a peripheral device 904, which may interrupt a LEAS session. In other words, the peripheral device 904 may stop rendering the audio stream after receiving the LEAP_Stop_Stream packet 906.

In 908, the peripheral device 904 may request that the connection parameters (e.g., the connection interval) be changed as appropriate for non-streaming mode. The central device 902 may then transmit a LEAP_Select_Codec message 910 indicating a new codec to use (and possibly also one or more of a maximum packet size, connection interval appropriate for the selected codec, and/or a type of audio content). Once ready to render audio using the newly selected codec, the peripheral device 904 may transmit a LEAP_Codec_Ready message 912 to the central device 902.

The central device 902 may then transmit a LEAP_Start_Stream message 914 to the peripheral device 904, change the connection interval as appropriate for the selected codec (which may be different than used with the previous codec, e.g., depending on compression rates, efficiency, etc.), and start (resume) the audio stream. As similarly noted with respect to FIG. 8, the central device 902 may also indicate an additional rendering delay for synchronization purposes, if appropriate, either as a parameter of the LEAP_Start_Stream message 914, or as a parameter of a separate LEAP_Delay_Stream message 918 as illustrated in FIG. 9.

Figure 10:
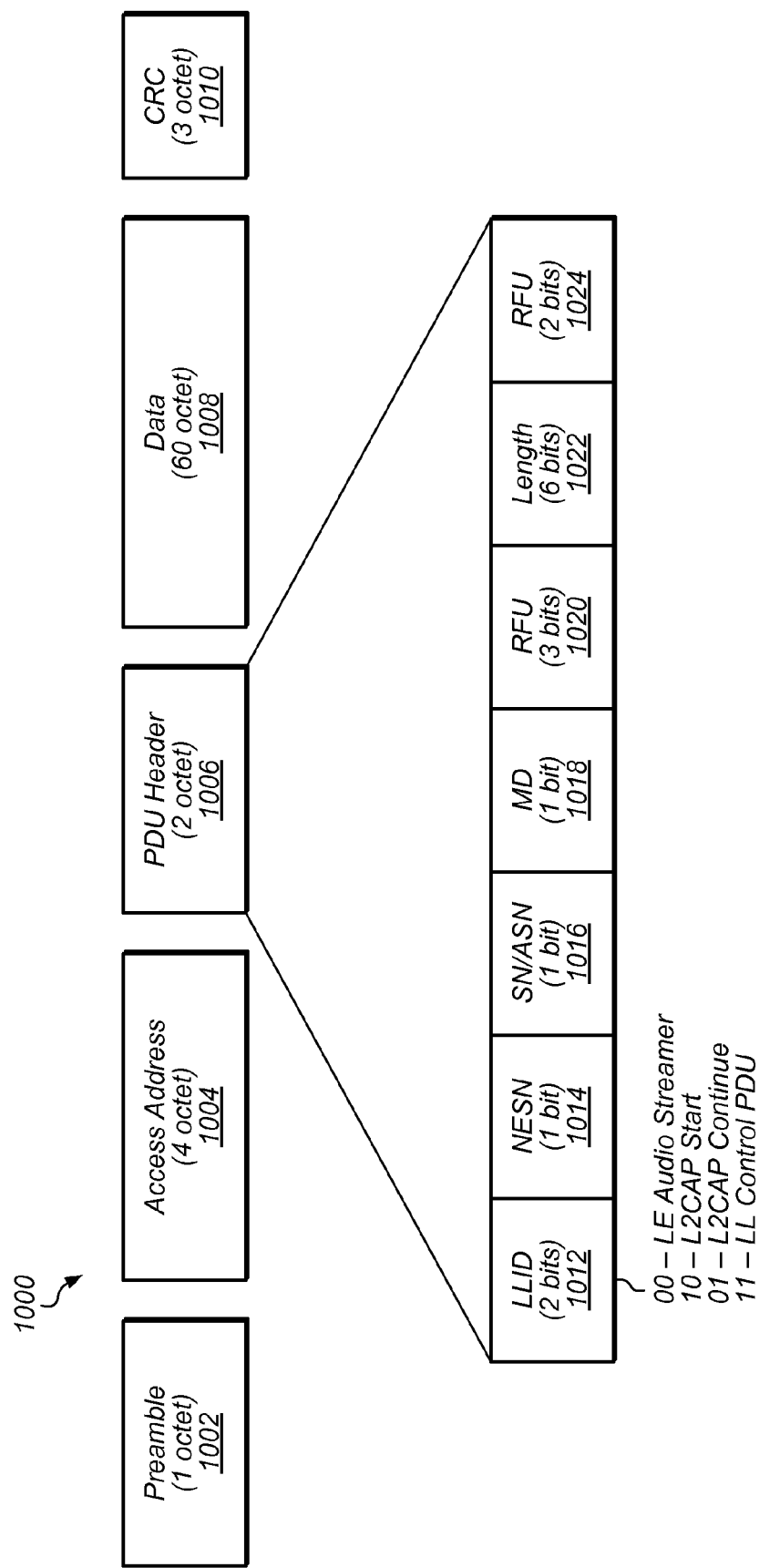
FIG. 10 illustrates an exemplary BLE link layer packet structure.

FIG. 10—Link Layer Audio Packet Format

FIG. 10 illustrates an exemplary packet format 1000 which may be used at the BLE link layer (LL) for transport of audio data. As shown, the LL packet structure 1000 may include a preamble field 1002, an access address field 1004, a PDU header field 1006, an audio data field 1008, and a CRC field 1010.

The PDU header field 1006 may include several sub-fields. Among these may be a link layer identifier (LLID) sub-field 1012, a next expected sequence number (NESN) sub-field 1014, a sequence number (SN/ASN) sub-field 1016, a more data (MD) sub-field 1018, a reserved for future use (RFU) sub-field 1020, a length sub-field 1022, and an additional RFU sub-field 1024.

In order to specify an LE audio streamer packet, an LLID to identify a packet as a LEAS packet may be defined. For example, as illustrated in FIG. 10, while LLID values of 10b, 01b, and 11b may specify L2CAP start, L2CAP continue, and LL control packets respectively, the (previously reserved) LLID value 00b may be defined as specifying a LEAS packet. This may effectively indicate to the receiver of the packet 1000 that the data payload (i.e., data field 1008) contains LE audio streamer data.

Because LEAS may be used for real-time audio transport, an LL communication scheme utilizing 'connection event pairs' may be utilized. In particular, audio data for a particular period of time may be transmitted at a 'primary connection event'. If the audio data for that particular period of time is not successfully transmitted at the 'primary connection event', the audio data may be transmitted at a 'retransmission connection event'. Because of the adaptive frequency hopping techniques used in Bluetooth, the retransmission connection event may occur on a different frequency than the primary connection event, which may improve the chances of a successful transmission in case of an unsuccessful transmission at the primary connection event. A 'primary event' and a 'retransmission event' may form a connection event pair. Regardless of whether or not the audio data transmission is successful after a retransmission event, the audio data for that particular period of time may be flushed after a connection event pair, in order to keep up with the real-time stream and transmit audio data for a next period of time. Thus, rather than utilizing sequence numbers such as for LL control or L2CAP packets, an event type (ET) indicator may be used for LEAS packets.

Accordingly, the NESN sub-field 1014 and SN sub-field 1016 may apply as such primarily to LL control PDUs and L2CAP packets. More particularly, for a LEAS packet, the NESN sub-field 1014 may be incremented to acknowledge the receipt of an LL control or L2CAP packet, but may not be used to provide acknowledgement of LEAS packets. Additionally, for a LEAS packet, the SN sub-field 1016 may be used as an ET sub-field. For example, for LEAS packets sent from a central device to a peripheral device, the ET bit may be set to '0' in primary events and '1' in retransmission events. If desired, for LEAS packets sent from a peripheral device to a central device, the ET bit may be set to '0' for all events, since (as detailed further hereinbelow) each connection event may be initiated by a communication from a central device to a peripheral device. As a further modification relative to the Bluetooth Core specification, version 4.0, the length field may be extended to 6 bits.

In order to provide acknowledgement capability for LEAS packets (e.g., since the NESN sub-field 1014 may be incremented in acknowledgment of LL control and L2CAP packets but not LEAS packets), a receiving device may respond to a LEAS packet with any LL packet by way of acknowledgement of that LEAS packet. For example, a zero length L2CAP packet might be used to acknowledge receipt of a LEAS packet, as one possibility. In other words, any response to a LEAS packet (e.g., during the same connection event in which the LEAS packet is transmitted) may be considered as an acknowledgement by the sending device. In some or all cases (e.g., during retransmission events), it may not be required to acknowledge LEAS packets, e.g., in order to save power.

Note also that it may be the case that message integrity checks (MICs, which may be used in conjunction with some other LL packets) may not be used for (may not follow) LL audio streamer data in the payload of a LEAS packet.

Figure 11:
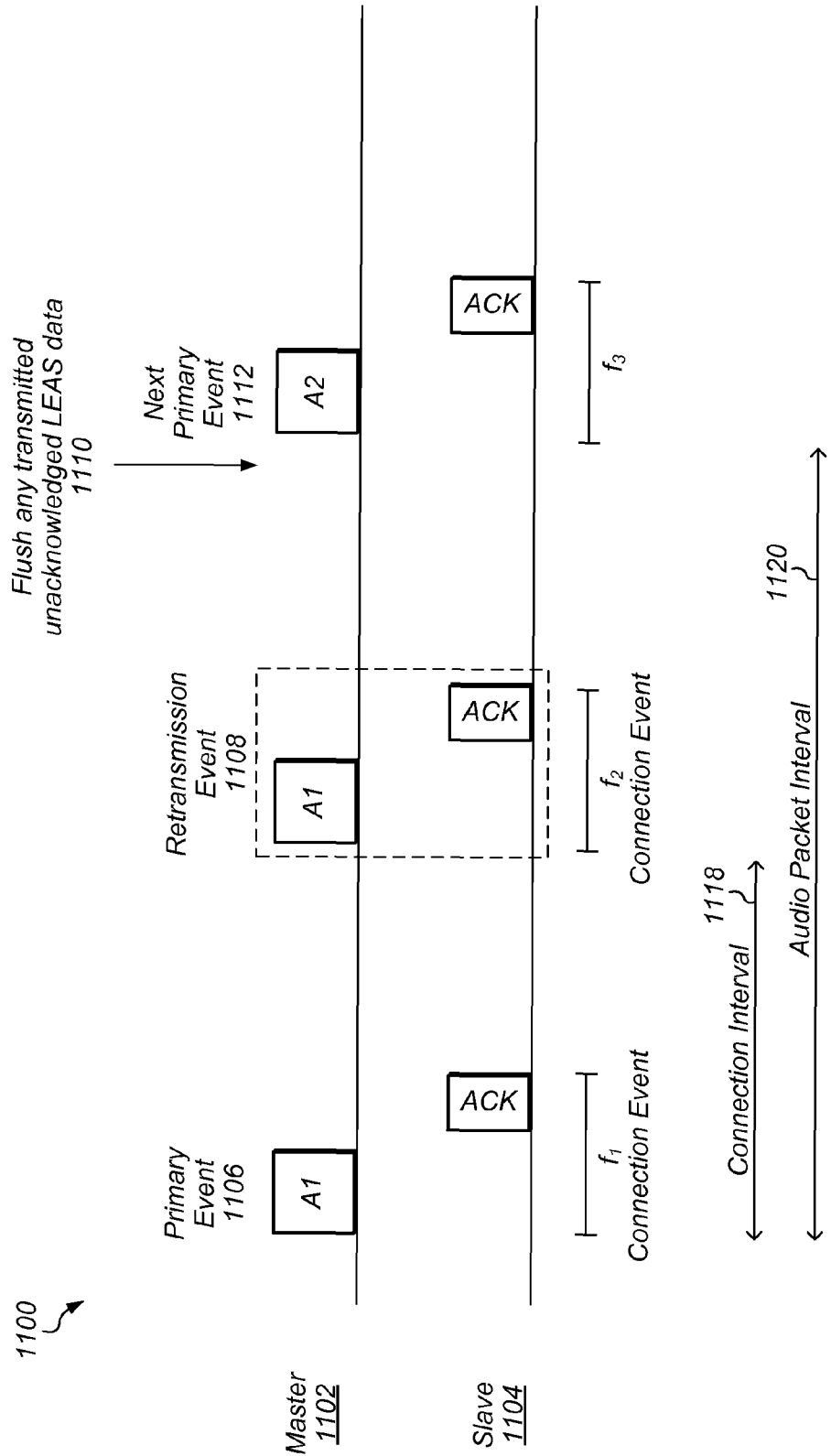
FIGS. 11-14 illustrate exemplary aspects of a possible link layer timing scheme for communicating audio using BLE.
Figure 12:
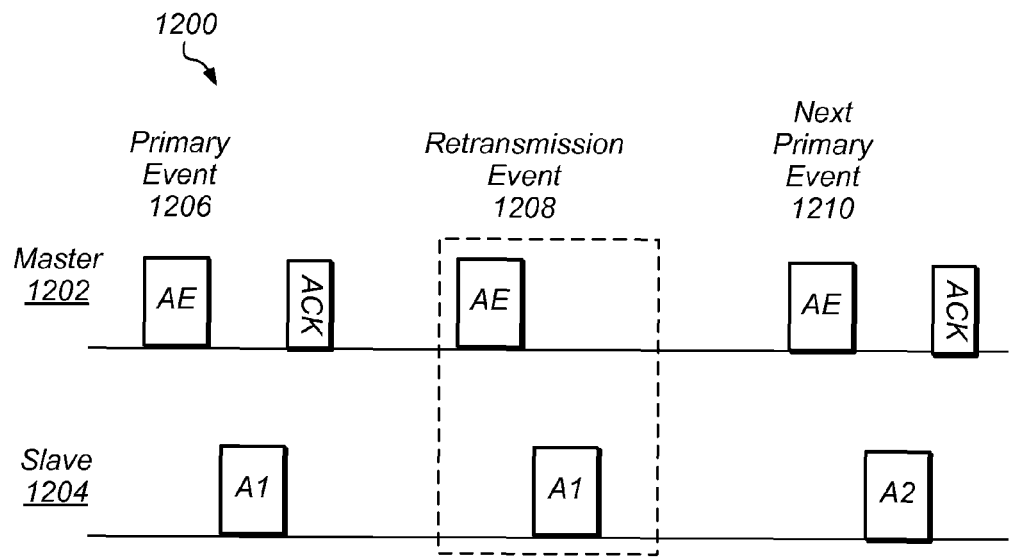
Figure 13:
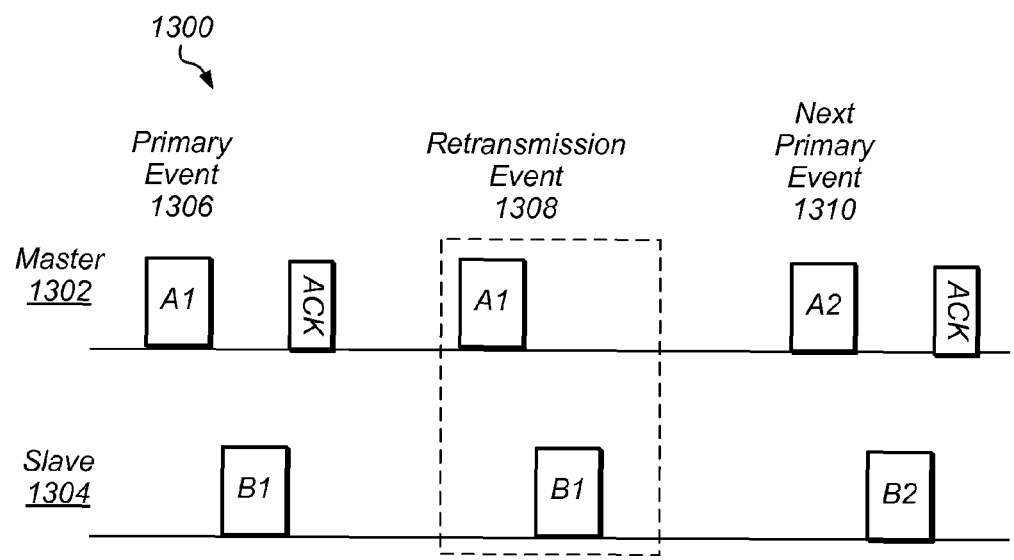

FIGS. 11-13—Link Layer Packet Timing for LE Audio Transport

FIGS. 11-13 illustrate an exemplary link layer timing scheme 1100 which may be used for transporting audio data in BLE in conjunction with various aspects of the present disclosure.

As noted hereinabove in conjunction with FIG. 10, there may be two types of connection events for LEAS packets, 'primary events' and 'retransmission events'. Every other connection event may be a primary event. A primary event may be followed by a retransmission event. Thus, as shown, primary event 1106 may be followed by retransmission event 1108. The dashed lines around the retransmission event 1108 indicate that, at least in some cases, retransmission events may be optional. Note additionally that although an ACK is shown in the retransmission event 1108, and ACKs may be used in conjunction with retransmission events in some cases, if desired, it may be the case that ACKs are generally not used in retransmission events. Together, a primary event and a retransmission event may form a connection event pair. Since LE audio streamer transport may generally be used for real-time audio sessions, in 1110 any transmitted unacknowledged LEAS data may be flushed after a connection event pair. A next connection event pair may then be initiated with a next primary event 1112.

As shown, the 'connection interval' 1118 may be the distance (i.e., in time) between connection events. The 'audio packet interval' 1120 may be the distance (i.e., in time) between primary events. One audio packet may be configured to include audio data corresponding to a length of time equal to (or approximating) the length of time of the audio packet interval, such that communicating one audio packet per audio packet interval may provide a continuous stream of audio data.

It may be possible for LEAS data to flow as 'LEA output' (from central/master 1102 to peripheral/slave 1104), 'LEA input' (from peripheral/slave 1104 to central/master 1102), or 'LEA bi-directional (from central/master 1102 to peripheral/slave 1104 and from peripheral/slave 1104 to central/master 1102). FIG. 11 illustrates an exemplary LEA output scenario 1100, i.e., in which audio data is being transmitted from the master 1102 to the slave 1104. FIG. 12 illustrates an exemplary LEA input scenario 1200, i.e., in which audio data is being transmitted from a slave 1204 to a master 1202. FIG. 13 illustrates an exemplary LEA bi-directional scenario 1300, i.e., in which audio data is being transmitted both from a master 1302 to a slave 1304 and from the slave 1304 to the master 1302.

For LEA output, a single LEAS packet may be transmitted at the primary event by the master 1102. If the slave 1104 successfully receives the LEAS packet at the primary event, the slave 1104 may transmit an acknowledgement to the master 1102 in response to the LEAS packet at the primary event. As previously noted with respect to FIG. 10, a LEAS packet may be acknowledged with any packet. As one example, the acknowledgement packet might be an empty (null) L2CAP packet.

If the slave 1104 does not acknowledge the LEAS packet sent at the primary event, the LEAS packet may be retransmitted at the retransmission event corresponding to that primary event. As noted above, the LEAS packet may be flushed after the retransmission event regardless of whether or not it was acknowledged (e.g., due to real-time transport considerations). As also noted above, the ET sub-field of a LEAS packet may be set to '0' in primary events and '1' in retransmission events as an indicator of the event type to which the LEAS packet corresponds.

It may be the case that the slave 1104 always tries to receive a LEAS packet from the master 1102 at a primary event during a LEAS session. If the slave does not receive a LEAS packet at the primary event, it may also try to receive the LEAS packet in the retransmission event. If, however, the slave 1104 correctly receives a LEAS packet in a primary event, it may skip the following retransmission event and sleep until the next primary event. This may conserve power at both the master 1102 and the slave 1104, as well as increase the available block of time between connection events (which may facilitate efficient co-existence with other wireless communication technologies which share the same air interface, as described in further detail with respect to FIG. 14).

Using such an audio transport scheme as described herein, it may also be possible to insert L2CAP and/or LL control packets into a LEAS audio stream. In particular, it may be possible for the master 1102 to send an L2CAP or LL control packet to the slave 1104 in the primary event instead of a LEAS packet. Since the slave 1104 may always receive the first packet at a primary event, the slave may receive this packet. Further, since it is not an LEAS packet, the slave may also wake up for the retransmission event and receive the LEAS packet for that connection event pair at that time.

Additionally, the slave 1104 may transmit an L2CAP or LL control packet having a payload to the master 1102 instead of a null packet to acknowledge a LEAS packet at a primary event. In such a case, the master 1102 may transmit an ACK (e.g., a null packet having an incremented NESN) back to the slave 1104 at the primary event in case of successful reception of the L2CAP or LL control packet.

It may be the case that only one packet having a payload may be transmitted in either direction at each connection event. Note that while in some cases (e.g., most commonly for LEA input and bi-directional communication), the master 1102 may transmit two packets in a single connection event (e.g., if one is an ACK packet), in such cases the master 1102 may still only transmit one packet having a payload (i.e., since the ACK may be a null packet).

For LEA input (e.g., as illustrated in FIG. 12), the master 1202 may initiate a primary event by sending an empty (zero payload) LEAS packet (shown as "AE") at the primary event 1206. The slave 1204 may then respond with an LEAS packet containing audio data (shown as "A1"). The master 1202 may then respond with an empty L2CAP packet as an ACK if the LEAS data from the slave 1204 was received correctly.

If the master 1202 did not correctly receive the audio data from the slave 1204 in the primary event 1206, the master 1202 may send an empty LEAS packet at the following retransmission event 1208. The slave 1204 would in that case re-send the same audio data in an LEAS packet as sent in the primary event 1206. The master 1202 may (or may not, since the data would be flushed at the end of the connection event pair in any case) respond with an empty L2CAP packet upon successful receipt of the LEAS packet at the retransmission event 1208. If the master 1202 acknowledges the LEAS data in the primary event, the slave 1204 (as well as the master 1202) may skip the retransmission event 1208 and sleep until the next primary event 1210.

As similarly described with respect to LEA output, the master 1202 may send an L2CAP or LL control packet at the primary event 1206. In the case of LEA input, the L2CAP or LL control packet may be sent in place of the empty LEAS packet. The slave 1204 may still respond with an LEAS packet containing audio data. If this audio data is ACKed by the master 1202, both the master 1202 and the slave 1204 may sleep until the next primary event 1210.

The slave 1204 may itself send an L2CAP or LL control packet instead of a LEAS packet in the primary event 1206. In order to initiate the retransmission event 1208, then, the master 1202 may in this case also send an empty LEAS packet to the slave 1204 in the retransmission event 1208, since no audio data was received by the master 1202 at the primary event 1206. The slave 1204 may then respond with a LEAS packet containing audio data for that connection event pair. Note that it may be the case that only LEAS packets (i.e., no L2CAP or LL control packets) may be sent at the retransmission event 1208.

It should be noted that if an L2CAP or LL control packet is transmitted in a LEAS stream, as described hereinabove with respect to FIG. 10, the NESN sub-field of a LEAS packet may be used to ACK (or NACK) that L2CAP or LL control packet. Further, note that if a null packet (e.g., an empty L2CAP packet) is being used as an ACK for an L2CAP or LL control packet transmitted in a LEAS stream, the NESN sub-field of the null packet may more particularly serve as the ACK (or NACK) for that packet. In this way, if an L2CAP or LL control packet is not successfully received during one connection event pair, an additional attempt may be made to transmit that L2CAP or LL control packet at the primary event of a subsequent connection event pair.

For LEA input, a connection event may be considered terminated after the master 1202 sends a packet to the slave 1204, the slave 1204 responds with a packet, and the master 1202 sends an empty L2CAP packet (i.e., as acknowledgement). Note again that acknowledgment(s) may be unnecessary at retransmission events; as with LEA output, LEAS packets may be flushed after a connection event pair due to the real-time nature of the LEAS data.

For LEA bi-directional transport (e.g., as illustrated in FIG. 13), the principles of LEA input and output may be combined. In particular, a single LEAS packet having audio content may be transmitted at the primary event by the master 1302. If the slave 1304 successfully receives the LEAS packet at the primary event, the slave 1304 may transmit a LEAS packet having (e.g., different) audio content in response to, and as acknowledgement of, the audio packet received from the master 1302. The master 1302 may then respond with an empty L2CAP packet as an ACK if the LEAS data from the slave 1304 was received correctly. Since in such a case audio data is received successfully by both sides at the primary event 1306, both the master 1302 and the slave 1304 would then be able to sleep through the retransmission event 1308 and wake again at the next primary event 1310.

If either the master 1302 or the slave 1304 does not successfully receive audio data at the primary event 1306 of LEA bi-directional transport (e.g., due to transmission of one or more L2CAP or LL control packets in place of one or more LEAS packets at the primary event 1306, RF conditions causing packet loss, or any of various other reasons), audio data may be transmitted at the retransmission event 1308. Depending on whether the master 1302, the slave 1304, or both do not successfully receive audio data at the primary event 1306, the transmission scheme at the retransmission event 1308 may effectively provide any of LEA input, LEA output, or LEA bi-directional audio transport. For example, if only the slave 1304 still needs audio data for the connection event pair, the master 1302 may simply transmit a LEAS packet having its audio data for the connection event pair. If only the master 1302 still needs audio data for the connection event pair, the master 1302 may transmit an empty LEAS packet, in response to which the slave 1304 may transmit a LEAS packet having its audio data for the connection event pair. If both the master 1302 and slave 1304 still need audio data for the connection event pair, the master 1302 may transmit a LEAS packet having its audio data for the connection event pair, in response to which the slave 1304 may transmit a LEAS packet having its audio data for the connection event pair.

Figure 14:
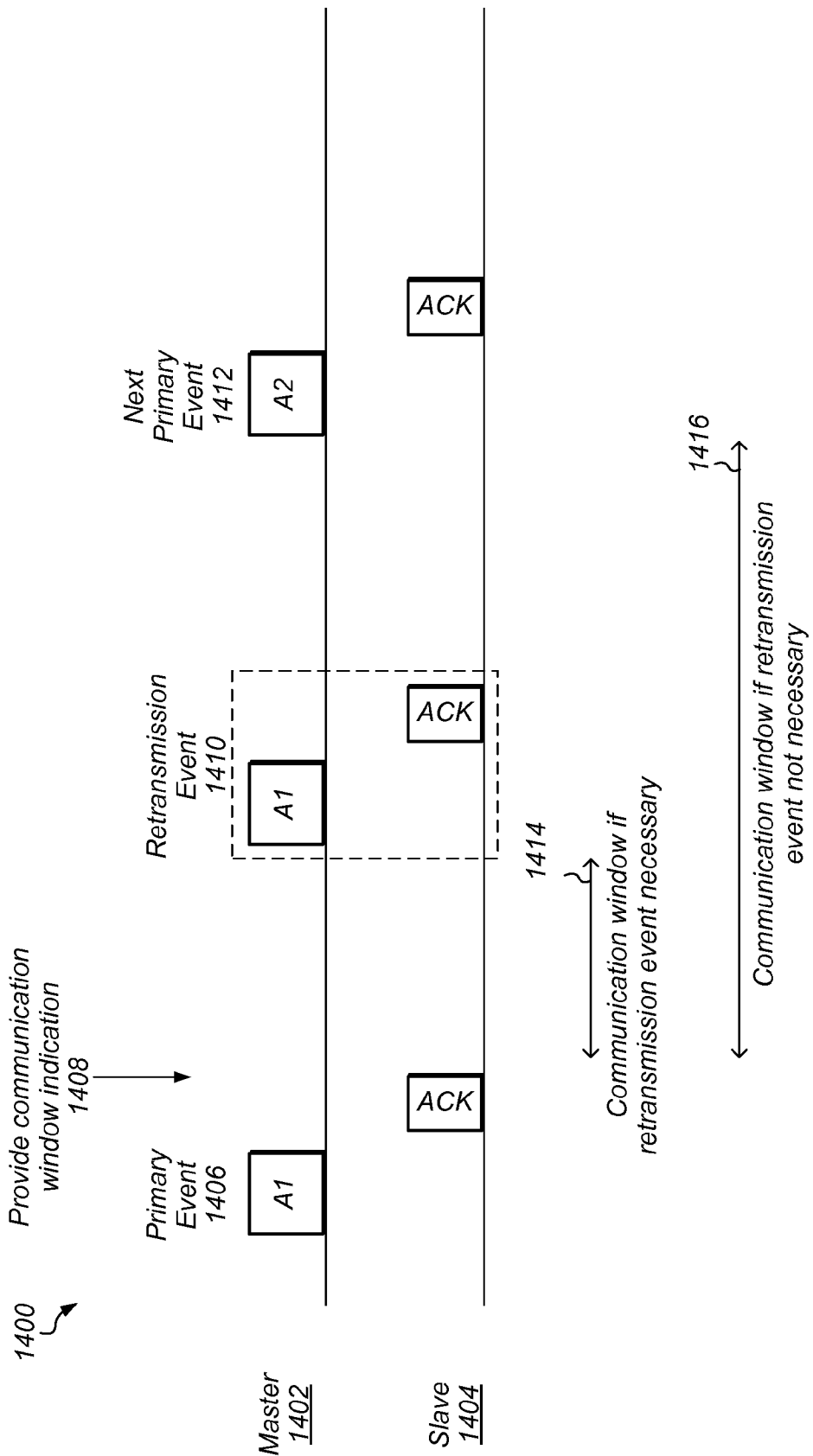

FIG. 14—Coexistence Considerations with Link Layer Timing

FIG. 14 illustrates an exemplary link layer timing scheme 1400 which may be used in transporting audio data in BLE in conjunction with various aspects of the present disclosure, similar to the link layer timing scheme illustrated in FIG. 11, in which certain considerations relating to coexistence with other wireless communication technologies are noted.

As shown, in the illustrated scheme a master device 1402 and a slave device 1404 may communicate audio data using a LE audio stream via connection event pairs. Thus, the master 1402 and the slave 1404 may communicate at a primary event 1406, optionally at a retransmission event 1410, and then again at a next primary event 1412. Although the particular scheme illustrated in FIG. 14 may correspond to one possible LEA output scenario, it should be noted that the coexistence considerations described hereinbelow with respect to FIG. 14 may be equally applicable to other LEA output scenarios (e.g., if data is transmitted instead of audio in the primary event, if no ACK is used at the retransmission event, etc.), any of various LEA input scenarios (such as illustrated in and described with respect to FIG. 12), and/or any of various LEA bi-directional scenarios (such as illustrated in and described with respect to FIG. 13).

As previously noted, in many cases devices may implement multiple wireless communication technologies. In some such cases, multiple wireless communication technologies may coexist on the same frequency band, and/or may share wireless communication circuitry (e.g., one or more antennas). For example, Bluetooth and Wi-Fi may sometimes share the 2.4 GHz ISM radio frequency band. Accordingly, many devices may utilize an architecture in which at least some wireless communication circuitry is shared between Bluetooth and Wi-Fi.

In such a device, in which communication circuitry is shared between Bluetooth and Wi-Fi, it may be helpful for the device circuitry/firmware/software which controls Bluetooth communication (also referred to as "Bluetooth logic" or "BLE logic") to inform the device circuitry/firmware/software which controls Wi-Fi communication (also referred to as "Wi-Fi logic") of communication windows in which Bluetooth communication is scheduled and/or not scheduled, in order to facilitate efficient shared resource control, among other considerations. Note that the BLE logic and the Wi-Fi logic may be co-located (e.g., may be located on the same chip/integrated circuit) in at least some cases.

Accordingly, consider that the master 1402 illustrated in FIG. 14 may be a device capable of communicating using either Bluetooth or Wi-Fi using shared wireless communication circuitry. In such a case, following a primary event of a connection event pair, BLE logic in the master 1402 may provide an indication of an available communication window to Wi-Fi logic in the master 1402. This indication may inform the Wi-Fi logic of a length of time for which the BLE logic will not be performing wireless communication.

As shown, the length of the communication window may vary depending on whether a retransmission event is scheduled or not. Accordingly, the BLE logic may determine, at the end of a primary event (i.e., a BLE LEAS frame), whether or not a retransmission event will occur. For example, if one of the master 1402 or the slave 1404 transmitted control data in place of audio data at the primary event, the BLE logic may determine that a retransmission event will occur on this basis. Similarly, if any audio data (either from master 1402 to slave 1404, or from slave 1404 to master 1402) was not ACKed at the primary event, the BLE logic may determine that a retransmission event will occur on this basis. If, however, all expected audio data (i.e., from master 1402 to slave 1404, or from slave 1404 to master 1402, or both, depending on whether the LEAS communication is LEA input, LEA output, or LEA bi-directional) is successfully received and ACKed, the BLE logic may determine that a retransmission event will not occur on this basis.

Thus, based at least in part on whether or not a retransmission event is scheduled or not, the BLE logic may determine the length of the communication window available to the Wi-Fi logic. In particular, as shown, a length of time corresponding to a first communication window 1414 may be indicated as the length of the communication window if a retransmission event is scheduled, while a length of time corresponding to a second communication window 1416 may be indicated as the length of the communication window if a retransmission event is not scheduled.

The actual lengths of the first communication window and the second communication window may also depend on additional considerations, and in particular the connection interval selected for the LE audio stream. As previously noted, the connection interval for a LE audio stream may be configurable (e.g., while communicating using LEAP to set up the LE audio stream). Each connection event (e.g., a primary event or a retransmission event) may last one BLE frame, so the length of the first communication window $t_{CW1}$ may be:

$$t_{CW1} = t_{CI} - t_F,$$

where $t_{CI}$ is the connection interval length and $t_F$ is the BLE frame length. Similarly, the length of the second communication window $t_{CW2}$ may be:

$$t_{CW2} = 2*t_{CI} - t_F.$$

As specific examples, consider two possible scenarios. Consider first that for both scenarios, each BLE frame may last 1.25 ms. As the first possible scenario, consider that the connection interval may be 2.5 ms (i.e., two times the BLE frame length). In this scenario, the communication window available if a retransmission event is necessary may be 1.25 ms (2.5−1.25). In contrast, the communication window available if a retransmission event is not necessary may be 3.75 ms (2*2.5−1.25). As the second possible scenario, consider that the connection interval may be 3.75 ms (i.e., three times the BLE frame length). In this scenario, the communication window available if a retransmission event is necessary may be 2.5 ms (3.75−1.25). In contrast, the communication window available if a retransmission event is not necessary may be 6.25 ms (2*3.75−1.25).

Thus, though the difference in available communication window length depending on whether or not a retransmission event is necessary may also depend on the connection interval, in general the available communication window may be significantly longer if no retransmission event is required. Accordingly, while it may be a significant boon to link quality to have available the possibility of utilizing a retransmission event (e.g., in case of a missed audio packet or if it is desired to insert a control packet into a LEAS stream), it may also be advantageous to skip retransmission events whenever possible (e.g., if all expected audio communication is completed successfully at a primary event). This may be the case both in order to decrease the power consumption required for BLE communication (i.e., since the BLE logic may spend proportionally more time in a low power state in between connection events), and also in at least some cases to provide a longer communication window to a coexisting wireless communication technology such as Wi-Fi. It may particularly be worth noting that increasing the length of an available communication window for Wi-Fi may have a disproportionately advantageous effect on the total throughput which may be achieved in that communication window, since a (relatively or precisely) fixed amount of that communication window may be required for communication overhead (e.g., contention procedures, headers, etc.) regardless of the length of the available communication window.

Figure 15:
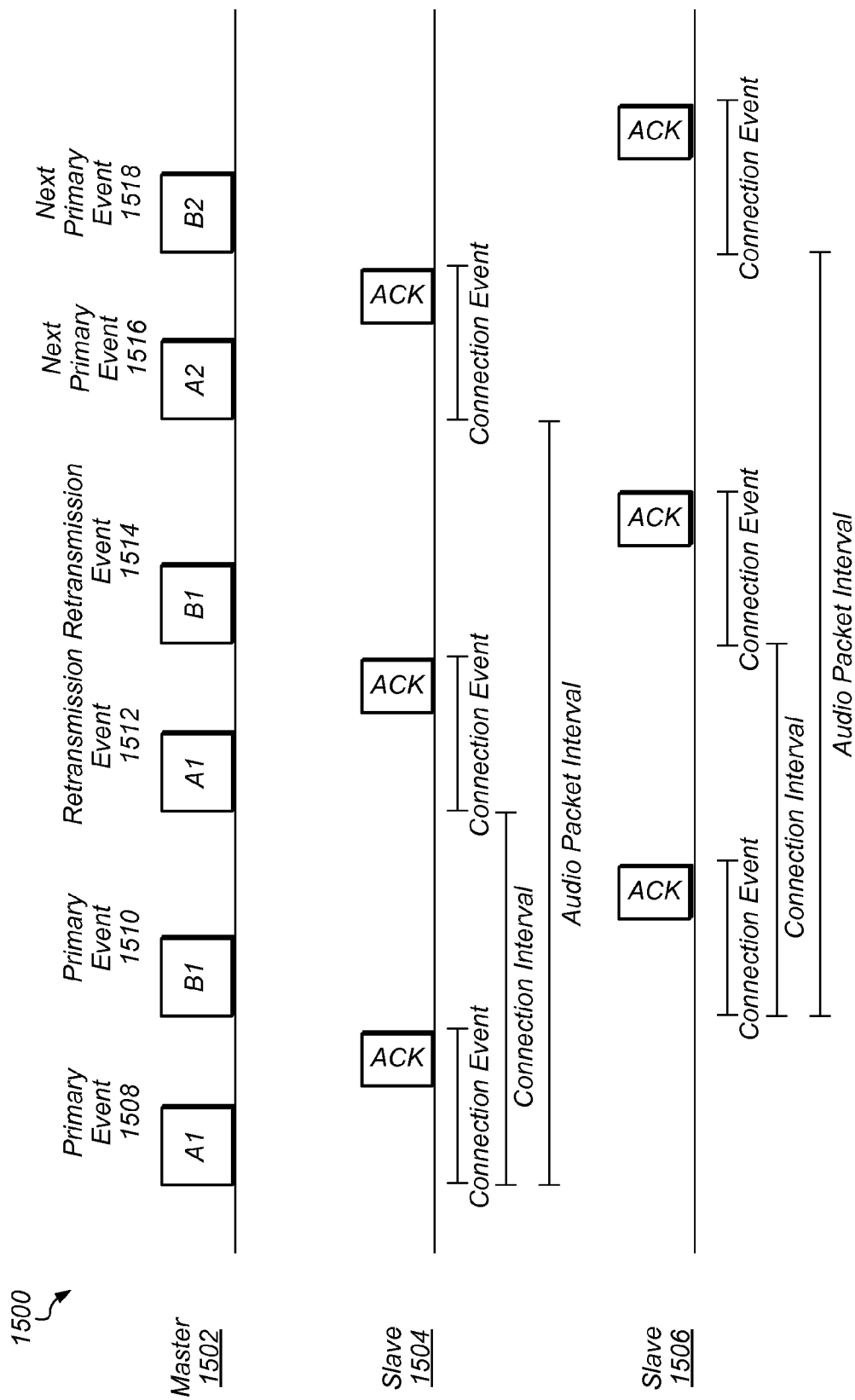
FIG. 15 illustrates exemplary aspects of a possible link layer timing scheme for communicating audio concurrently with multiple slave devices using BLE.

FIG. 15—Concurrent Communication with Multiple Slave Devices

While it is possible to use Bluetooth LEA communication between a single master/central device and a single slave/peripheral device, it may also be possible for a master device to concurrently perform LEA communication with multiple slave devices. For example, since Bluetooth LEA communication may be time-sliced such that there may be a gap (i.e., the difference between the connection interval and the BLE frame length) between connection events, it may be possible for a master device to schedule concurrent communications with multiple slave devices, e.g., by alternating connection events with one slave device and with another. FIG. 15 illustrates such a scheme 1500, in particular in which a master device 1502 concurrently communicates audio output streams to two slave devices 1504, 1506.

As shown, the master 1502 and the slave 1504 may communicate at primary event 1508, optionally at retransmission event 1512, and again at a next primary event 1516, e.g., in a similar manner as illustrated in and described with respect to FIG. 11. In addition, between these connection events, the master 1502 may also communicate with slave 1506.

In particular, as shown, following primary event 1508 (e.g., in the next BT frame), the master 1502 may communicate audio data to slave 1506 at primary event 1510. Similarly, following optional retransmission event 1512 (if used), an optional retransmission event 1514 may occur between the master 1502 and the slave 1506 (e.g., if audio data was not received/acknowledged by the slave 1506 at primary event 1510). Much in the same way, a next primary event 1518 in which audio data corresponding to a next audio packet interval may be communicated between the master 1502 and the slave 1506 may follow the next primary event 1516 between the master 1502 and the slave 1504.

In other words, connection intervals between the master 1502 and the slaves 1504 and 1506 may overlap, but in an offset manner such that connection events between the master 1502 and slave 1506 occur during a portion of the connection interval between master 1502 and slave 1504 which is not used for communication between master 1502 and slave 1504, while connection events between the master 1502 and slave 1504 occur during a portion of the connection interval between master 1502 and slave 1506 which is not used for communication between master 1502 and slave 1506.

Note that while for simplicity of understanding a limited number of connection events are illustrated in FIG. 15, similar (e.g., regular, periodic) scheduling may be configured for ongoing stream communication, such that an arbitrary number of further primary and retransmission events in which similar scheduling is used may occur.

Thus, by utilizing the timesliced communications as shown in FIG. 15, concurrent audio streaming may occur between a master device and multiple slave devices. Note that while in the exemplary timing scheme 1500 of FIG. 15, concurrent communication between a master device and two slave devices is illustrated, other scenarios in which other concurrent audio streaming with different numbers of (e.g., more than two) slave devices are also possible. The number of concurrent LE audio streams which a master device can support may, however, depend on the connection intervals used for each LE audio stream (e.g., since the window between connection events for the stream with the shortest connection interval may need to be long enough for connection events for each other stream).

Figure 16:
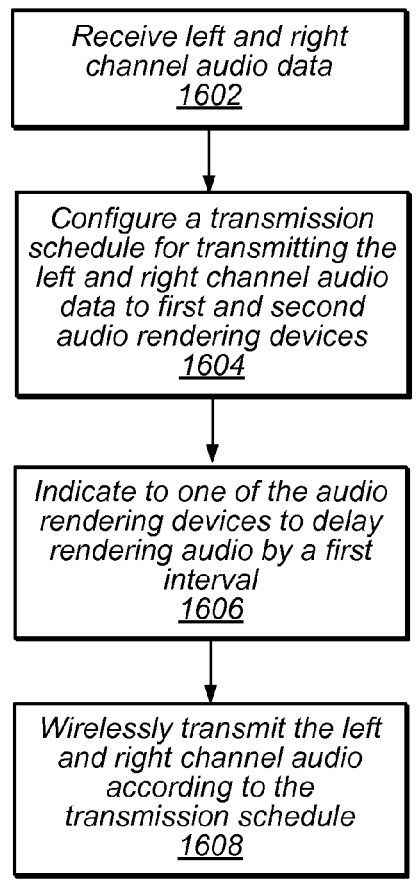
FIGS. 16-17 are flowchart diagrams illustrating methods for synchronizing rendering of multiple audio channels.
Figure 17:
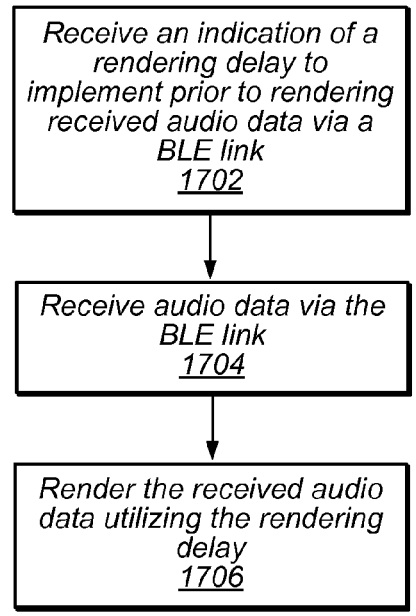

FIGS. 16-17—Multiple Audio Channel Synchronization with LEA

As noted with respect to FIG. 15, it may possible for a master device to concurrently perform LEA communication with multiple slave devices. In some instances, concurrent Bluetooth LEA communication between a master and multiple slaves can be used to provide multiple audio channels, e.g., for a multi-channel audio output. For example, left and right channel audio from a media player might be communicated to a left speaker device and a right speaker device. As another example, left and right channel audio from a voice call might be communicated to a left hearing aid device and a right hearing aid device.

FIGS. 16-17 are flowchart diagrams illustrating methods for implementing techniques for synchronizing rendering of those audio channels at their respective audio rendering devices. The methods of FIGS. 16-17 may be used, for example, to synchronize the rendering of left and right channel audio from a voice call being communicated to left and right hearing aid devices, to synchronize the rendering of stereo music streams between left and right speakers, and/or in any other appropriate context involving the synchronization of audio channels. The methods of FIGS. 16-17 may be implemented by a wireless user equipment (UE) device or other device capable of BLE communication. In particular, the method of FIG. 16 may be implemented by a wireless device acting as a master in a BLE communication system, while the method of FIG. 17 may be implemented by a wireless device acting as a slave in a BLE communication system. The methods shown in FIGS. 16-17 may be used in conjunction with any of the computer systems or devices shown in the above Figures, among other devices. Some of the method elements shown may be performed concurrently, in a different order than shown, or may be omitted. Additional method elements may also be performed as desired. As shown, the methods may operate as follows.

In 1602, left and right channel audio data may be received at the master device. For example, the audio data may be generated by and/or originate from an audio application (e.g., a media player application, a phone application, a voice or video chat application, etc.) executing on the master device. The audio data may then be received by the BLE logic in the master device via a system bus, such as UART, or by any of a variety of other means.

The left and right channel audio data may be packetized, such that the left channel audio is arranged as a first plurality of audio packets, while the right channel audio is arranged as a second plurality of audio packets. The packetized left and right channel audio data may be stored in a memory medium that is included in or accessible by the BLE logic, and/or may be stored in a memory medium that is accessible by an application processor of the master device. The packetized left and right channel audio data may include indications (e.g., in a packet header field or sub-field) that each packet corresponds to the left channel or the right channel, as appropriate. Additionally, the packetized left and right channel audio data may include indications of which packets from the left channel audio correspond to (i.e., are configured for simultaneous rendering with) which packets from the right channel audio. As one example, packets in each of the left and right channel audio may include sequence numbers, such that the audio data from packets in different audio channels with the same sequence number may be designated for simultaneous rendering with each other.

In 1604, the BLE logic may configure a transmission schedule for transmitting the left and right channel audio data to first and second audio rendering devices. The transmission schedule may be configured for use in an ongoing (e.g., regular, periodic) manner. According to the transmission schedule, each audio packet of the first plurality of audio packets may be transmitted to the first audio rendering device at a first interval after each corresponding audio packet of the second plurality of audio packets is transmitted to the second audio rendering device. For example, utilizing a time-sliced transmission scheme such as illustrated in and described with respect to FIG. 15, the BLE logic may schedule connection events for communicating audio data configured for simultaneous rendering by the first and second audio rendering devices for adjacent BLE frames.

Thus, based on the transmission schedule, packets configured for simultaneous rendering by the first and second audio rendering devices may be transmitted at a consistent, regular interval (i.e., the first interval), such as one BLE frame (e.g., 1.25 ms, at least in some implementations). Under such conditions, if the audio rendering device which is scheduled for the earlier communication frame were to add a delay/offset equal to the first interval before rendering audio received in each such communication frame, the resulting rendering of audio data configured for simultaneous rendering would indeed be synchronized and substantially simultaneous between the first and second audio rendering devices.

Accordingly, in 1606, the master device may indicate (e.g., by wireless BLE communication) to one of the audio rendering devices to delay rendering audio by the first interval. This indication may take any of a variety of forms. As one example, a delay parameter indicating a stream delay included in a LEAP_Start_Stream message or a LEAP_Delay_Stream message, such as described hereinabove with respect to FIGS. 8-9, may be used to indicate to one of the audio rendering devices to delay rendering audio received in a LE audio stream by the first interval. In some (though not all) instances, due to the repeating nature of the transmission schedule, a single indication of the appropriate stream delay (e.g., in a LEAP message during stream setup) may be sufficient to configure an audio rendering device to delay rendering of audio data received in each of numerous audio packets over the course of communicating an LE audio stream.

In 1608, the master device may wirelessly transmit (e.g., by wireless BLE communication) the left and right channel audio to the first and second audio rendering devices according to the transmission schedule. Audio data for each audio channel may be communicated via LE audio stream, such as using the BLE protocol stack illustrated in and described with respect to FIG. 6, the LE audio protocol illustrated in and described with respect to FIGS. 7-9, and/or the link layer audio packet format and timing schemes illustrated in and described with respect to FIGS. 10-15. Thus, in such a case, during each audio packet interval (e.g., encompassing one connection event pair) for each audio rendering device, one audio packet may be transmitted to that respective audio rendering device, either at a primary event or a retransmission event. Alternatively, audio data for each audio channel may be communicated using variations on or alternatives to the framework illustrated in and described with respect to those Figures.

As noted above, the method of FIG. 17 may be implemented by a wireless device acting as a slave in a BLE communication system. More particularly, the method of FIG. 17 may be used by an audio rendering device operating in conjunction with a wireless device implementing the method of FIG. 16. Thus, the audio rendering device implementing the method of FIG. 17 may be configured to render an audio channel (e.g., a left or right audio channel) of a multi-channel (e.g., stereo) audio output, while another audio rendering device may be configured to render another audio channel (e.g., the remaining left or right audio channel) of the multi-channel audio output.

In 1702, the audio rendering device may receive from a master device, via a BLE link, an indication of a rendering delay to implement prior to rendering audio data received via the BLE link. This indication may take any of a variety of forms. As one example (as similarly described with respect to FIG. 16), a delay parameter indicating a stream delay may be included in a LEAP_Start_Stream message or a LEAP_Delay_Stream message, such as described hereinabove with respect to FIGS. 8-9. The delay parameter may include a value indicating the length of the rendering delay to be implemented.

As similarly described with respect to the method of FIG. 16, the rendering delay may facilitate synchronization of rendering of stereo audio channels by the audio rendering device implementing the method of FIG. 17 and another audio rendering device. For example, the audio rendering device implementing the method of FIG. 17 may be scheduled by the master device for communication of audio data in timeslots prior to the audio rendering device configured to render the other channel of the stereo audio output. The rendering delay indicated to the audio rendering device implementing the method of FIG. 17 may be configured to compensate for this temporal difference in communication timeslots.

In 1704, audio data may be received via the BLE link. Similar to in the method of FIG. 16, the audio data may be communicated via LE audio stream, such as using any or all of the BLE protocol stack illustrated in and described with respect to FIG. 6, the LE audio protocol illustrated in and described with respect to FIGS. 7-9, and/or the link layer audio packet format and timing schemes illustrated in and described with respect to FIGS. 10-15. Alternatively, audio data for each audio channel may be communicated using variations on or alternatives to the framework illustrated in and described with respect to those Figures.

In 1706, the audio rendering device may render the received audio data. In particular, the audio rendering device may insert (add) a delay equal to the rendering delay indicated by the master device before rendering the audio data. Note that the rendering delay indicated by the master device may be added in addition to (cumulative with) any rendering delays between receiving and rendering audio inherent to the audio rendering device. This may be important since the audio rendering device configured to render the other channel of the stereo output may also include an inherent audio rendering delay between receiving and rendering audio, such that if any rendering delays between receiving and rendering audio inherent to the audio rendering device were included as part of the rendering delay indicated by the master device, rendering of the different audio channels by the different audio rendering devices would likely remain offset from each other.

Note also that in the case that the audio rendering devices have different inherent delays between receiving and rendering audio, the master device may account for this and modify (e.g., extend or shorten) the rendering delay indicated to the audio rendering device implementing the method of FIG. 17 accordingly.

Thus, the methods of FIGS. 16-17 may advantageously enable a master device and multiple slave devices to concurrently communicate audio data corresponding to multiple audio channels configured for simultaneous rendering in such a manner that rendering of that audio data is indeed synchronized for substantially (e.g., to millisecond or even microsecond level precision) simultaneous rendering.

Figure 18:
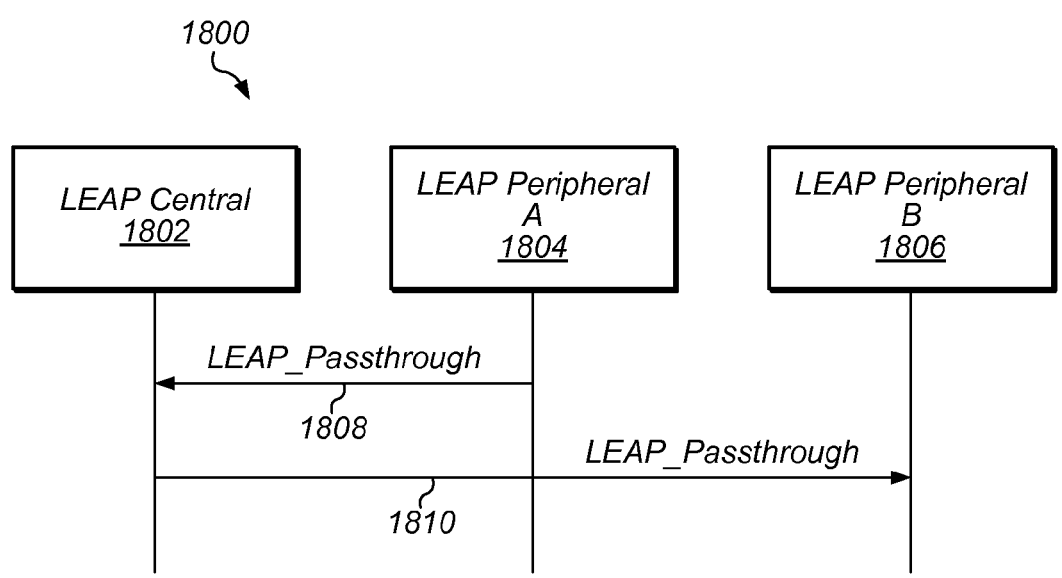
FIG. 18 is a message sequence diagram illustrating an exemplary message passthrough technique using an LE audio protocol.

FIG. 18—LEAP Passthrough

As noted previously herein with respect to FIGS. 16-17 and elsewhere, in some cases it may be possible for a device configured as a master in a BLE communication system to concurrently communicate with multiple devices configured as slaves in the BLE communication system, including for the purpose of communicating audio. In particular, as described with respect to FIGS. 16-17, in some cases such slave devices may be intended to operate in a coordinated manner, such as to render different audio channels of a multi-channel audio output.

In many cases, particularly with a low-power communication protocol such as BLE, there is a tendency for devices configured to operate as slaves (peripherals) to be implemented as relatively low complexity, low power devices, at which minimal computational capability may be desirable, e.g., in order to enable a smaller form factor and reduce power requirements. Accordingly, many such devices may be capable of operating as BLE slaves, but not as BLE masters. Nonetheless, given the potential desirability of coordinated operation, it may be desirable to provide a way for such devices to communicate with each other.

FIG. 18 is a message sequence diagram 1800 illustrating one such technique for enabling two BLE peripheral (slave) devices (LEAP Peripheral A 1804 and LEAP Peripheral B 1806) to communicate with each other using a message passthrough technique, in which messages are passed from one peripheral device to another via a central (master) device (LEAP Central 1802).

For example, the devices may utilize a BLE audio protocol such as the LE audio protocol described herein with respect to FIGS. 6-9. A "LEAP_Passthrough" packet type may thus be defined and assigned an opcode. A LEAP_Passthrough packet might also be defined as including a message parameter, which may have a variable length. Upon receiving such a message from a peripheral via a BLE link, a master may forward the message to another peripheral with which the master has an established BLE link.

Thus, as shown, LEAP Peripheral A 1804 may transmit a LEAP_Passthrough message 1808 to the LEAP central 1802. The LEAP central 1802 may then forward (transmit) the message as LEAP_Passthrough message 1810 to the LEAP Peripheral B 1806.

Such a message passthrough technique may have a number of applications. As one example, consider a scenario in which a user has left- and right-hearing aids which each have a BLE link with a smart phone (e.g., such as illustrated in and described with respect to FIG. 2). If the user wishes to adjust a setting (e.g., volume) on one of the hearing aids, it may (in some, though not necessarily all, cases) be desirable for the adjustment to be automatically communicated to the other hearing aid. Any number of alternate or additional benefits may also be realized using such a message passthrough technique.

It should be noted that, at least in some cases, it may be preferable to limit such a message passthrough capability to peripheral devices which are determined to be compatible with each other with respect to message passthrough. Compatibility may of course be defined and determined in any of a variety of ways. As one example, passthrough techniques may be provided only to peripheral devices with the same manufacturer (e.g., having the same company ID, such as might be indicated in a LEAP version packet). Other ways of defining and/or limiting passthrough capabilities/compatibilities are also possible.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

While examples have been provided above that relate to BLE, it should be understood that the techniques described herein may also be used, mutatis mutandis, in the context of any other appropriate wired or wireless communications technology, including but not limited to cellular, IEEE 802.11, Bluetooth, or other technologies. Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A wireless device configured to communicate audio data to first and second audio rendering devices via wireless communication links that are based on Bluetooth Low Energy (BLE) technology, wherein the audio data is for stereo audio output that includes a plurality of stereo audio channels, wherein the plurality of stereo audio channels comprise a left and a right audio channel, the wireless device comprising:

an antenna; and a processing element operatively coupled to the antenna; wherein the antenna and the processing element are configured to:

receive a first plurality of audio packets and a second plurality of audio packets, wherein:

the first plurality of audio packets includes audio data for a first audio channel from the plurality of stereo audio channels;

the second plurality of audio packets includes audio data for a second audio channel from the plurality of stereo channels; and for each audio packet in the first plurality of audio packets, there is a corresponding audio packet in the second plurality of audio packets, such that audio data in the audio packet in the first plurality of audio packets and audio data in the corresponding audio packet from the second plurality of audio packets are configured for simultaneous rendering as part of, respectively, the first audio channel and the second audio channel;

configure a transmission schedule for transmitting the first plurality of audio packets and the second plurality of audio packets, wherein, according to the transmission schedule:

audio packets from the first plurality of audio packets are scheduled for transmission to the first audio rendering device;

audio packets from the second plurality of audio packets are scheduled for transmission to the second audio rendering device; and each audio packet of the first plurality of audio packets is scheduled for transmission at a first interval after the corresponding audio packet from the second plurality of audio packets is scheduled for transmission;

indicate to the second audio rendering device to delay rendering the audio data received in the second plurality of audio packets by the first interval, wherein said indicating is performed at a first time prior to wirelessly transmitting the first plurality of audio packets and the second plurality of audio packets, and wherein the second audio rendering device is configured to delay rendering of each of the second plurality of audio packets by the first interval; and wirelessly transmit the first plurality of audio packets to the first audio rendering device and the second plurality of audio packets to the second audio rendering device via the wireless communication links according to the transmission schedule, wherein the first audio rendering device is configured to render the audio data received in the first plurality of audio packets without delaying the rendering by the first interval.

2. The wireless device of claim 1,
wherein corresponding packets of the first plurality of audio packets and the second plurality of audio packets are identified by sequence numbers.

3. The wireless device of claim 1, wherein the processing element comprises a baseband processing element, wherein the wireless device further comprises:
an application processor operatively coupled to the baseband processing element;
wherein the first plurality of audio packets and the second plurality of audio packets are received by the baseband processing element from the application processor.

4. The wireless device of claim 1,
wherein the transmission schedule utilizes timeslicing transmission techniques.

5. The wireless device of claim 4,
wherein according to the transmission schedule, each timesliced transmission occupies a predetermined frame length, wherein configuring the transmission schedule comprises scheduling corresponding packets of the first plurality of audio packets and the second plurality of audio packets for adjacent frames.

6. The wireless device of claim 1, wherein said indicating is performed in establishing an audio streaming session with the first audio rendering device and the second audio rendering device, wherein the second audio rendering device is configured to delay rendering of each of the second plurality of audio packets according to the first interval for the remainder of the audio streaming session.

7. The wireless device of claim 1,
wherein the antenna and the processing element are further configured to:
receive a LEAP_Passthrough message from either the first or the second audio rendering device;
forward the LEAP_Passthrough message to the other of the first or the second audio rendering device.

8. A method for a wireless device to synchronize audio rendering of multi-channel audio output by multiple audio rendering devices, wherein the multi-channel audio output comprises a left and a right audio channel, the method comprising:
at the wireless device:
receiving first audio data corresponding to a first audio channel of a multi-channel audio output and second audio data corresponding to a second audio channel of the multi-channel audio output, wherein the first audio data and the second audio data are configured for simultaneous rendering;

indicating, via wireless communication, to the second audio rendering device to delay rendering received audio data by a first length of time, wherein the second audio rendering device is configured to delay each audio packet according to the first length of time; and wirelessly transmitting the first audio data to the first audio rendering device and the second audio data to the second audio rendering device according to a transmission schedule, wherein, according to the transmission schedule, the first audio data is transmitted to the first audio rendering device after the second audio data is transmitted to the second audio rendering device, wherein the first length of time is based on a difference in transmission time between the first audio data and the second audio data, and wherein the first audio rendering device is configured to render the audio data received without delaying the rendering by the first length of time.

9. The method of claim 8,
wherein indicating to the second audio rendering device to delay rendering received audio data by the first length of time and transmitting according to the transmission schedule configures the second audio rendering device to render the second audio data simultaneously with the first audio rendering device rendering the first audio data.

10. The method of claim 8,
wherein the first audio data and the second audio data comprise audio packets each having a sequence number, wherein the sequence numbers of the first audio data and the second audio data match, wherein the method further comprises:
determining that the first audio data and the second audio data are configured for simultaneous rendering based at least in part on the sequence numbers of the first audio data and the second audio data.

11. The method of claim 8,
wherein the first audio data comprises an indication that the first audio data corresponds to the first audio channel of the multi-channel audio output, wherein the second audio data comprises an indication that the second audio data corresponds to the second audio channel of the multi-channel audio output, wherein the method further comprises:
determining to transmit the first audio data to the first audio rendering device based at least in part based on the indication that the first audio data corresponds to the first audio channel of the multi-channel audio output; and
determining to transmit the second audio data to the second audio rendering device based at least in part based on the indication that the second audio data corresponds to the second audio channel of the multi-channel audio output.

12. The method of claim 8,
wherein the first and second audio data are received at a baseband processor of the wireless device via a system bus.

13. The method of claim 8, wherein according to the transmission schedule, each timesliced connection event occupies a predetermined frame length, wherein configuring the transmission schedule comprises scheduling transmission of the first and second audio data in adjacent frames.

14. The method of claim 8,
wherein wirelessly transmitting the first audio data and the second audio data to the first and second audio rendering devices according to the transmission schedule is performed using wireless communication that is based on Bluetooth Low Energy (BLE) technology.

15. The method of claim 8, wherein said indicating is performed in establishing an audio streaming session with the first audio rendering device and the second audio rendering device, wherein the second audio rendering device is configured to delay rendering of each of the second plurality of audio packets according to the first length of time for the remainder of the audio streaming session.

16. The method of claim 8, further comprising:
at the wireless device:
receiving a LEAP_Passthrough message from either the first or the second audio rendering device;
forwarding the LEAP_Passthrough message to the other of the first or the second audio rendering device.

17. An apparatus for a wireless device to synchronize audio rendering of multi-channel audio output by multiple audio rendering devices, wherein the multi-channel audio output comprises a left and a right audio channel, the apparatus comprising:
one or more processing elements, wherein the one or more processing elements are configured to:
establish an audio streaming session with at least a first audio rendering device and a second audio rendering device, wherein said establishing the audio streaming session comprises:
wirelessly transmitting a first message to the first audio rendering device; and
wirelessly transmitting a second message to the second audio rendering device;
wherein the second message comprises a parameter indicating to the second audio rendering device to delay rendering each received audio packet of the audio streaming session by a first length of time; and
wirelessly transmitting audio data of the audio streaming session to at least the first audio rendering device and the second audio rendering device, wherein said wireless transmitting comprises:
wirelessly transmitting a first plurality of audio packets to the first audio rendering device;
wirelessly transmitting a second plurality of audio packets to the second audio rendering device;
wherein each audio packet of the first plurality of audio packets is wirelessly transmitted the first length of time after a corresponding audio packet from the second plurality of audio packets is wirelessly transmitted, wherein the first audio rendering device is configured to render each received audio packet of the audio streaming session without delaying the rendering by the first length of time;
wherein at least the first audio rendering device and the second audio rendering device are configured to render the first plurality of packets and the second plurality of packets in a synchronized manner by using the indicated delay.

18. The apparatus of claim 17, wherein said wirelessly transmitting the audio data is performed using Bluetooth Low Energy (BLE).

19. The apparatus of claim 17, wherein corresponding packets of the first plurality of audio packets and the second plurality of audio packets are identified by sequence numbers.

20. The apparatus of claim 17,
wherein the one or more processing elements are further configured to:
receive a LEAP_Passthrough message from either the first or the second audio rendering device;
forward the LEAP_Passthrough message to the other of the first or the second audio rendering device.

* * * * *